United States Patent
Kumagai

(10) Patent No.: US 7,801,432 B2
(45) Date of Patent: Sep. 21, 2010

(54) IMAGING APPARATUS AND METHOD FOR CONTROLLING THE SAME

(75) Inventor: Fumihiro Kumagai, Tokyo (JP)

(73) Assignee: Sony Corporation, Tokyo (JP)

( * ) Notice: Subject to any disclaimer, the term of this patent is extended or adjusted under 35 U.S.C. 154(b) by 174 days.

(21) Appl. No.: 12/237,607

(22) Filed: Sep. 25, 2008

(65) Prior Publication Data

US 2009/0116830 A1 May 7, 2009

(30) Foreign Application Priority Data

Nov. 5, 2007 (JP) ............................ 2007-287886

(51) Int. Cl.
*G03B 17/00* (2006.01)
*G03B 13/18* (2006.01)

(52) U.S. Cl. ............................... 396/79; 396/89
(58) Field of Classification Search ............... 396/77, 396/79, 80, 89, 102, 125
See application file for complete search history.

(56) References Cited

U.S. PATENT DOCUMENTS

| | | | | |
|---|---|---|---|---|
| 5,587,842 | A * | 12/1996 | Iijima et al. | 359/698 |
| 7,702,231 | B2 * | 4/2010 | Sugimoto | 396/123 |
| 2004/0208114 | A1 * | 10/2004 | Lao et al. | 369/125 |
| 2005/0270410 | A1 | 12/2005 | Takayama | |
| 2007/0286589 | A1 | 12/2007 | Ishiwata et al. | |
| 2007/0286590 | A1 | 12/2007 | Terashima | |
| 2008/0031611 | A1 * | 2/2008 | Konishi | 396/102 |

FOREIGN PATENT DOCUMENTS

| | | |
|---|---|---|
| JP | 2006-18246 | 1/2006 |
| JP | 2006-201282 | 8/2006 |
| JP | 2007-178543 | 7/2007 |
| JP | 2007-178577 | 7/2007 |
| JP | 2007-328212 | 12/2007 |
| JP | 2007-328215 | 12/2007 |
| JP | 2008-58559 | 3/2008 |

* cited by examiner

*Primary Examiner*—Rodney E Fuller
(74) *Attorney, Agent, or Firm*—Oblon, Spivak, McClelland, Maier & Neustadt, L.L.P.

(57) ABSTRACT

An imaging apparatus includes an object information holding unit to hold a size of a predetermined object included in a subject; an imaging unit to convert incident light from the subject to a captured image; an object detecting unit to detect the object included in the captured image and a size of an object image; an object-autofocus-range calculating unit to calculate an object-autofocus-range that is a limited movement range of a focus lens; a use determination range calculating unit to calculate a use determination range that is a range to determine whether detection of an in-focus position of the detected object is to be performed in the object-autofocus-range and that includes the object-autofocus-range; and an autofocus control unit to detect the in-focus position by setting the object-autofocus-range and moving the focus lens in the object-autofocus-range if a current position of the focus lens is within the use determination range.

10 Claims, 14 Drawing Sheets

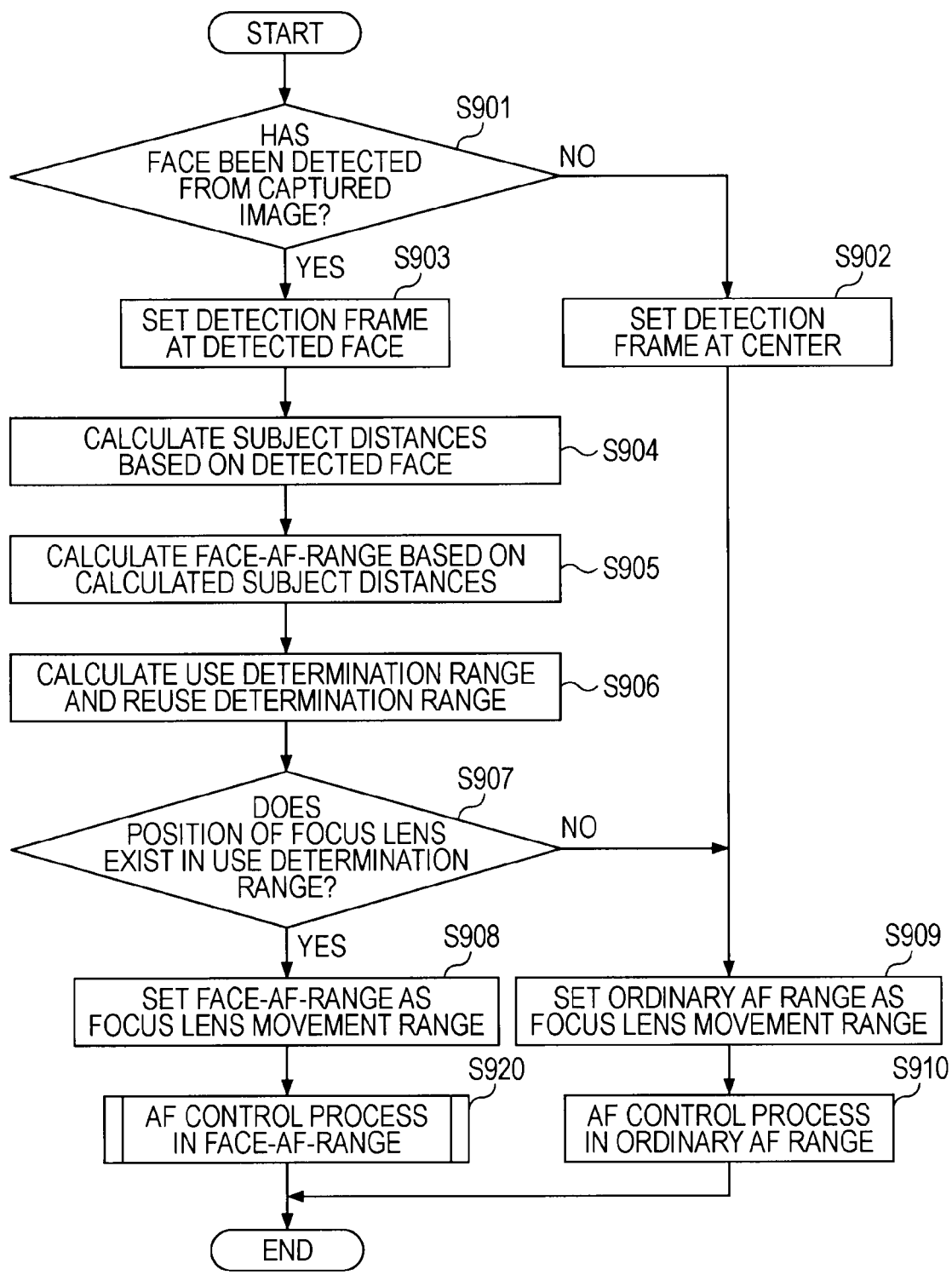

IMAGING APPARATUS AND METHOD FOR CONTROLLING THE SAME

CROSS REFERENCES TO RELATED APPLICATIONS

The present invention contains subject matter related to Japanese Patent Application JP 2007-287886 filed in the Japanese Patent Office on Nov. 5, 2007, the entire contents of which are incorporated herein by reference.

BACKGROUND OF THE INVENTION

1. Field of the Invention

The present invention relates to imaging apparatuses. More specifically, the present invention relates to an imaging apparatus having an autofocus (AF) function and to a method for controlling the imaging apparatus.

2. Description of the Related Art

In recent years, imaging apparatuses to capture images of subjects including people and record the images as captured image data, such as digital video cameras, have been widespread. As this type of imaging apparatuses, many imaging apparatuses having an AF function to automatically focus on a subject have been suggested.

For example, there has been suggested an imaging apparatus to perform AF control by detecting a contrast signal from captured image data and specifying an in-focus position based on a signal level of the contrast signal. In this AF control method, it is determined that an in-focus level is higher as the signal level of the contrast signal (AF evaluation value) is higher, and focus control is performed by moving a focus lens to the position where the largest AF evaluation value can be obtained. According to this AF control method, an in-focus position can be specified by using captured image data converted by an imaging device, and thus it is unnecessary to provide a ranging optical system other than an imaging optical system in the imaging apparatus. For this reason, the AF control method has been widely used in digital still cameras and the like in recent years.

Also, there has been recently suggested an imaging apparatus capable of detecting a face from a captured image, setting an area serving as an AF target onto the face in the captured image based on information about the detected face, and appropriately focusing on the face in the captured image. Also, there has been suggested an imaging apparatus to set a driving range of a focus lens based on a face detected from a captured image.

For example, there has been suggested an imaging apparatus to detect information of a face of a subject from captured image data, estimate the distance to the subject (subject distance) based on the detected information of the face, and change a driving range of a focus lens in accordance with the subject distance and a depth-of-field (e.g., see Patent Document 1: Japanese Unexamined Patent Application Publication No. 2006-18246 (FIG. 1)).

SUMMARY OF THE INVENTION

According to the above-described related art, the driving range of the focus lens can be changed in accordance with the subject distance and the depth-of-field estimated based on the information of the face of the subject, and thus time for AF can be shortened.

Now, the case where a face as a target of AF moves is discussed. For example, in the case where a face as a target of AF is moving, focusing on the face may be performed while the face is tracked. When focusing on the moving face is performed while the face is tracked in this way, the value of a subject distance estimated based on the detected face can significantly change. Also, when focusing on the moving face is performed while the face is tracked, false detection of a face can occur. When false detection of a face occurs, too, the value of a subject distance estimated based on the face can significantly change.

In the above-described case where the value of an estimated subject distance significantly changes, a movement range of the focus lens significantly changes. Since the focus lens moves in accordance with the change of the movement range of the focus lens, the focus lens may shake considerably. In this case where the focus lens shakes considerably, time is necessary to detect an in-focus position and focus control may not stably be performed.

Accordingly, the present invention is directed to stably performing focus control on a predetermined object.

According to an embodiment of the present invention, there is provided an imaging apparatus including object information holding means for holding a size of a predetermined object included in a subject; imaging means for converting incident light from the subject to a captured image; object detecting means for detecting the object included in the captured image and a size of an object image, the size of the object image being a size of the object in the captured image; object-autofocus-range calculating means for calculating an object-autofocus-range that is a limited movement range of a focus lens based on the detected size of the object image and the size of the object held in the object information holding means; use determination range calculating means for calculating a use determination range that is a range to determine whether detection of an in-focus position of the detected object is to be performed in the object-autofocus-range and that includes the object-autofocus-range; and autofocus control means for detecting the in-focus position by setting the object-autofocus-range as the movement range of the focus lens and moving the focus lens in the object-autofocus-range if a current position of the focus lens is within the use determination range. Also, there is provided a method for controlling the imaging apparatus. With this configuration, the object-autofocus range can be calculated based on the size of the object image detected from the captured image and the held size of the object, and the use determination range including the object-autofocus-range can be calculated. If the current position of the focus lens is within the use determination range, the in-focus position can be detected by moving the focus lens in the object-autofocus-range.

The imaging apparatus may further include detection frame setting means for setting a detection frame for the detected object at a position of the detected object in the captured image; and cancel determining means for determining whether a cancel condition is satisfied based on high-frequency components in an image area included in the set detection frame, the cancel condition being a certain condition to cancel setting of the object-autofocus-range. The autofocus control means may detect the in-focus position by canceling setting of the object-autofocus-range and using an entire movable range of the focus lens if it is determined that the cancel condition is satisfied. Accordingly, the detection frame for the object detected from the captured image can be set at the position of the object, and whether the cancel condition is satisfied can be determined based on the high-frequency components in the image area included in the set detection frame. If it is determined that the cancel condition is satisfied, the in-focus position can be detected by canceling setting of the object-autofocus-range and using the entire movable range of the focus lens.

The use determination range calculating means may calculate a reuse determination range that is a range to determine whether the object-autofocus-range is to be reset and that includes the object-autofocus-range. The autofocus control means may detect the in-focus position by resetting the object-autofocus-range as the movement range of the focus lens if it is determined that the cancel condition is not satisfied and if the current position of the focus lens is within the reuse determination range in the state where detection of the in-focus position is being performed using the entire movable range after setting of the object-autofocus-range has been canceled. Accordingly, the reuse determination range including the object-autofocus range can be calculated. Also, the in-focus position can be detected by resetting the object-autofocus range if it is determined that the cancel condition is not satisfied and if the current position of the focus lens is within the reuse determination range in the state where detection of the in-focus position is being performed using the entire movable range after setting of the object-autofocus-range has been canceled.

The use determination range calculating means may calculate a range narrower than the use determination range as the reuse determination range. Accordingly, a range narrower than the use determination range can be calculated as the reuse determination range.

The use determination range calculating means may calculate the use determination range by adding certain ranges before and after the object-autofocus-range. Accordingly, the use determination range can be calculated by adding certain ranges before and after the object-autofocus-range.

The use determination range calculating means may change the certain ranges in accordance with a position of a zoom lens. Accordingly, the certain ranges can be changed in accordance with the position of the zoom lens.

The object information holding means may hold at least a first size and a second size different from each other about the object. The object-autofocus-range calculating means may calculate a first subject distance that is a distance to the detected object based on the detected size of the object image and the first size of the object held in the object information holding means and calculate a second subject distance that is a distance to the detected object based on the detected size of the object image and the second size of the object held in the object information holding means, thereby calculating the object-autofocus range based on the calculated first and second subject distances. Accordingly, the first subject distance can be calculated based on the size of the object image detected from the captured image and the held first size of the object and the second subject distance can be calculated based on the size of the object image detected from the captured image and the held second size of the object, whereby the object-autofocus range can be calculated based on the first and second subject distances.

The autofocus control means may detect the in-focus position by performing wobbling in the object-autofocus-range. Accordingly, the in-focus position can be detected by performing wobbling in the object-autofocus-range.

According to the embodiment of the present invention, focus control can be stably performed on a predetermined object advantageously.

BRIEF DESCRIPTION OF THE DRAWINGS

FIG. 12 is a flowchart illustrating a procedure of an AF control process performed by the imaging apparatus according to the embodiment of the present invention;

DESCRIPTION OF THE PREFERRED EMBODIMENTS

Hereinafter, an embodiment of the present invention is described in detail with reference to the drawings.

Figure 1:
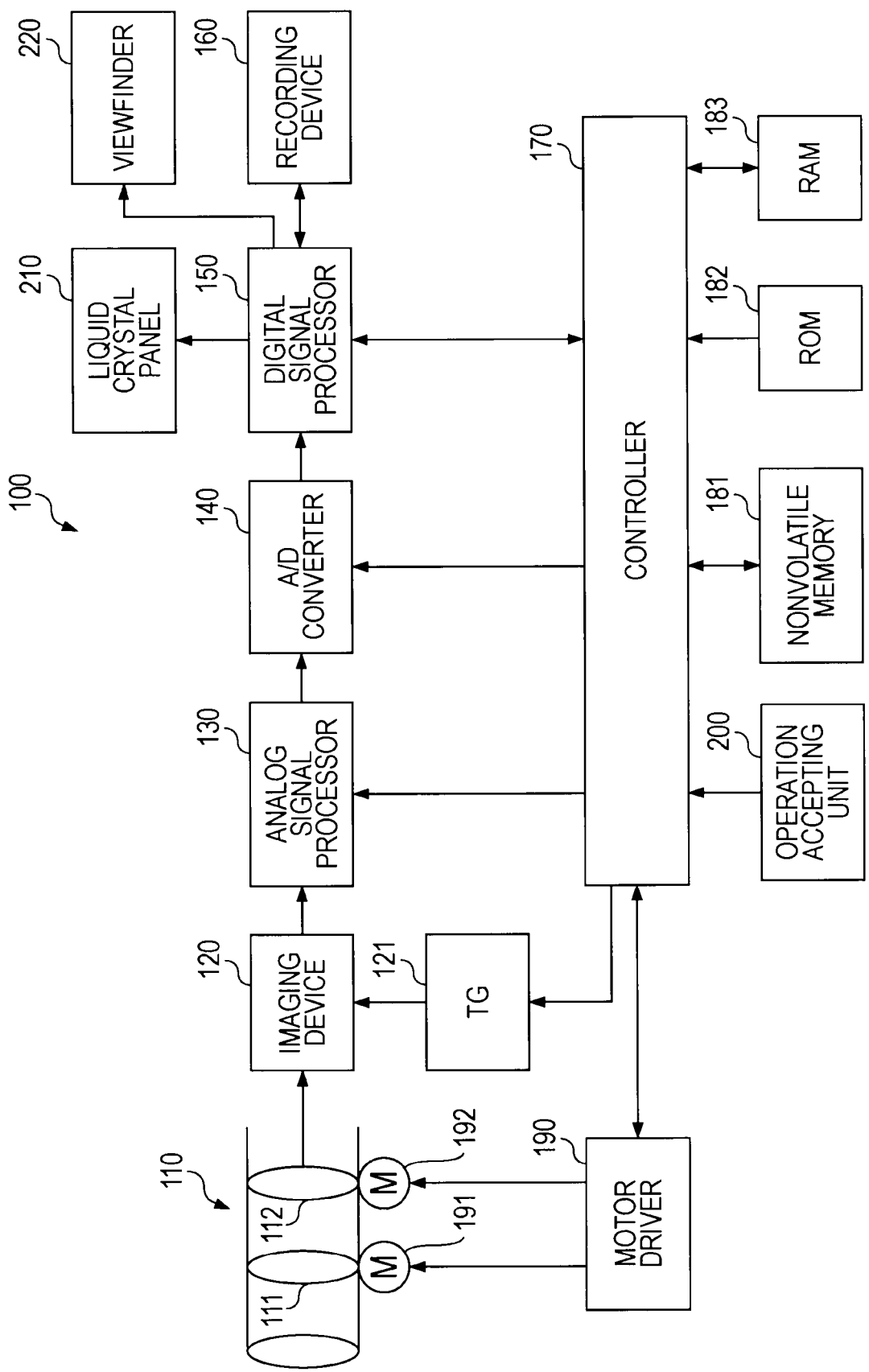
FIG. 1 is a block diagram illustrating an example of a configuration of an imaging apparatus according to an embodiment of the present invention.

FIG. 1 is a block diagram illustrating an example of a configuration of an imaging apparatus 100 according to the embodiment of the present invention. The imaging apparatus 100 includes a lens unit 110; an imaging device 120; a TG (timing generator) 121; an analog signal processor 130; an A/D (analog/digital) converter 140; a digital signal processor 150; a recording device 160; a controller 170; a nonvolatile memory 181; a ROM (read only memory) 182; a RAM (random access memory) 183; a motor driver 190; actuators 191 and 192; an operation accepting unit 200; a liquid crystal panel 210; and a viewfinder 220. The imaging apparatus 100 can be realized by, for example, a Camcorder having a face detecting function and an autofocus (AF) function.

The lens unit 110 is an optical system including a zoom lens 111 to continuously change a focal length; a focus lens 112 to adjust focus; an iris (not illustrated) to change an aperture; an ND (neutral density) mechanism (not illustrated) to insert an adjusting ND filter used to adjust illumination while reducing a diffraction effect caused by the aperture; and a shift-vibration-isolating camera shake correcting lens (not illustrated) to correct camera shake during imaging. The lens unit 110 collects light from a subject and outputs it to the imaging device 120. Here, the zoom lens 111 is moved in an optical axis direction by drive of the actuator 191, so as to adjust the focal length. That is, a zooming function is realized by the zoom lens 111. On the other hand, the focus lens 112 is moved in the optical axis direction by drive of the actuator 192, so as to adjust focus. That is, an AF function is realized by the focus lens 112. For example, in the case of a compact digital video camera, a lens called "inner focus type" in which a focus lens is moved in conjunction with movement of a zoom lens along a curve called a tracking curve by computer control has been widely adopted.

The imaging device 120 forms a subject image captured through the lens unit 110 and generates an image signal while operating in accordance with a timing signal supplied from the TG 121. That is, the imaging device 120 receives light from a subject entered via the lens unit 110 and performs photoelectric conversion so as to generate an analog image signal corresponding to the amount of received light, and then supplies the generated analog image signal to the analog signal processor 130. As the imaging device 120, a widely used solid-state imaging device, such as a CCD (charge coupled device) or a CMOS (complementary metal oxide semiconductor) sensor, may be used for example.

The TG 121 supplies a timing signal to set image acquisition timing to the imaging device 120 based on control by the controller 170.

The analog signal processor 130 performs analog signal processing, such as denoising, on the analog image signal supplied from the imaging device 120 and supplies the processed image signal to the A/D converter 140 based on control by the controller 170.

The A/D converter 140 A/D converts the analog image signal supplied from the analog signal processor 130 and supplies image data as a digital signal obtained through the A/D conversion to the digital signal processor 150 based on control by the controller 170.

The digital signal processor 150 performs digital signal processing, such as edge enhancement, gamma correction, and flicker elimination, on the image data supplied from the A/D converter 140 and supplies the processed image data (captured image data) to the liquid crystal panel 210 and the viewfinder 220 based on control by the controller 170. Also, the digital signal processor 150 outputs the image data supplied from the A/D converter 140 to the recording device 160 and records the image data therein. Furthermore, the digital signal processor 150 supplies image data recorded in the recording device 160 to the liquid crystal panel 210.

The recording device 160 holds the image data supplied from the digital signal processor 150 and supplies image data recorded therein to the digital signal processor 150. As the recording device 160, a semiconductor memory such as a disc memory card or a removable recording medium such as a DVD (digital versatile disc) can be used, for example. The recording device 160 may be included in the imaging apparatus 100 or may be attachable to and detachable from the imaging apparatus 100.

The controller 170 controls the respective units constituting the imaging apparatus 100 by executing a program recorded in the ROM 182. For example, the controller 170 includes an autofocus mechanism, an auto exposure mechanism, and an auto white balance adjusting mechanism, and controls the motor driver 190 and so on in order to realize the best focus position, the best luminance, and the best color reproduction. Also, the controller 170 performs various processes in response to signals output from the operation accepting unit 200. Furthermore, the control unit 170 performs an AF control process related to the AF function based on a program recorded in the ROM 182. The AF control process is described in detail below with reference to FIG. 2.

The nonvolatile memory 181 is an EEPROM (electrically erasable programmable read only memory) or a flash memory to store data and the like that is necessary to be held even in the state where the power of the imaging apparatus 100 is off based on control by the controller 170.

The ROM 182 is a memory to store programs executed by the controller 170 and data necessary for the controller 170 to execute the programs.

The RAM 183 is a memory to temporarily store programs and data necessary for the controller 170 to perform various processes and is used as a work area or the like of a program executed by the controller 170.

The motor driver 190 drives the actuators 191 and 192 based on control by the controller 170.

The actuator 191 is a motor to move the zoom lens 111 in the optical axis direction in order to determine a focal length by being driven based on control by the motor driver 190.

The actuator 192 is a motor to move the focus lens 112 in the optical axis direction in order to adjust a focal position by being driven based on control by the motor driver 190.

The operation accepting unit 200 accepts an operation performed by a user and supplies a signal corresponding to the accepted operation to the controller 170.

The liquid crystal panel 210 displays images corresponding to image data supplied from the digital signal processor 150. For example, images captured by the imaging device 120 (so-called through images) are displayed on the liquid crystal panel 210. Also, various menu screens are displayed on the liquid crystal panel 210.

The viewfinder 220 is used by a photographer to check an imaging range when he/she captures an image of a subject, and images corresponding to image data supplied from the digital signal processor 150 (e.g., through images) are displayed thereon.

Figure 2:
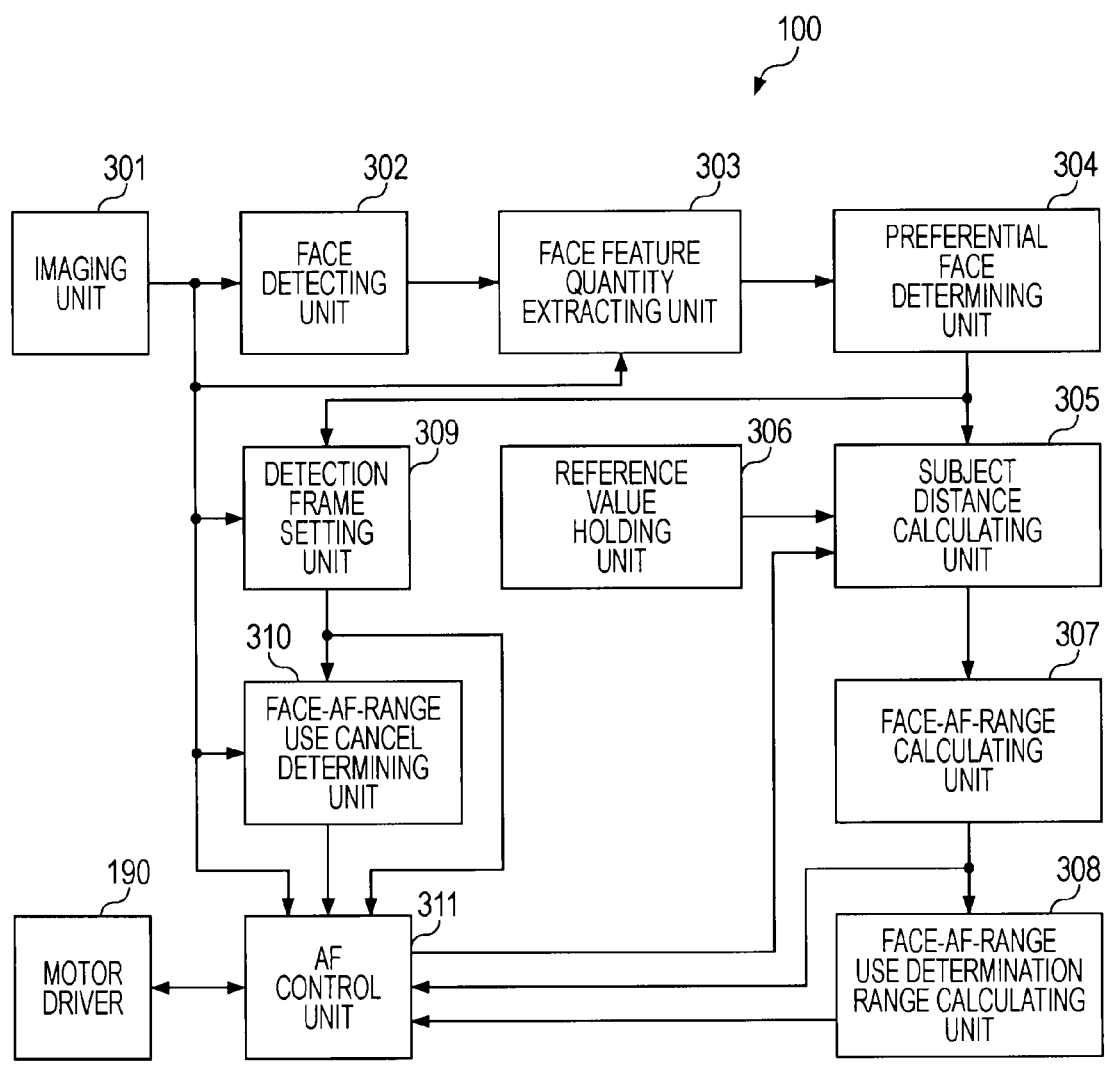
FIG. 2 is a block diagram illustrating an example of a functional configuration of the imaging apparatus according to the embodiment of the present invention.

FIG. 2 is a block diagram illustrating an example of a functional configuration of the imaging apparatus 100 according to the embodiment of the present invention. The imaging apparatus 100 includes an imaging unit 301; a face detecting unit 302; a face feature quantity extracting unit 303; a preferential face determining unit 304; a subject distance calculating unit 305; a reference value holding unit 306; a face-AF-range calculating unit 307; a face-AF-range use determination range calculating unit 308; a detection frame setting unit 309; a face-AF-range use cancel determining unit 310; an AF control unit 311; and the motor driver 190. The motor driver 190 is the same as that illustrated in FIG. 1, and is thus denoted by the same reference numeral and the corresponding description is omitted.

The imaging unit 301 converts incident light from a subject to a captured image and outputs the captured image generated through the conversion to the face detecting unit 302, the face feature quantity extracting unit 303, the detection frame setting unit 309, the face-AF-range use cancel determining unit 310, and the AF control unit 311. The imaging unit 301 corresponds to the lens unit 110, the imaging device 120, the analog signal processor 130, the A/D converter 140, and the digital signal processor 150 illustrated in FIG. 1.

The face detecting unit 302 detects a face of a person included in a captured image output from the imaging unit 301 and outputs information about the detected face to the face feature quantity extracting unit 303. As a face detecting method, a face recognition technique or a face tracking technique according to a related art can be applied. For example, face detection can be realized through matching between a template having luminance distribution information of a face and a real image (e.g., see Japanese Unexamined Patent Application Publication No. 2004-133637). First, a group of templates of face luminance distribution information obtained when a face is inclined is prepared. These templates correspond to inclinations with respect to X, Y, and Z axes of a face three-dimensional orthogonal coordinate system, and the inclination of an actual face is determined through matching with the templates. Also, a plurality of types of scaled-down images are prepared by scaling down a real image. Then, matching between the group of templates and the plurality of types of scaled-down images is performed. The matching is sequentially performed by shifting the scaled-down images on a two-dimensional plane. If a certain area matches any of the templates, it can be determined that a face exists in the area. The size of the face can be calculated based on a scaling factor of the real image. Furthermore, rotation angles (i.e., yaw, pitch, and roll angles) of the face around the orthogonal three axes can be obtained from the template that is used at the matching.

Information about a face includes the position in a captured image of a face image including a detected face; the size of the face image in the captured image (e.g., width and area of the face image); the number of detected faces; and a movement amount of the detected face(s).

The face feature quantity extracting unit 303 extracts a feature quantity of a face detected by the face detecting unit 302 in a captured image output from the imaging unit 301, and outputs a face feature quantity as the extracted feature quantity and information about the face to the preferential face determining unit 304. When a plurality of faces are detected by the face detecting unit 302, the face feature quantity extracting unit 303 extracts the feature quantity of the respective faces.

The preferential face determining unit 304 determines the face of a principal subject among the faces detected by the face detecting unit 302 to be a preferential face based on the face feature quantity and the information about the faces output from the face feature quantity extracting unit 303. Then, the preferential face determining unit 304 outputs the position and size of a face image corresponding to the determined preferential face to the subject distance calculating unit 305 and the detection frame setting unit 309. The preferential face is determined based on the size of a face area including a detected face, the coordinates of the face area, the value of faceness of the detected face, a front-oriented degree of the detected face, and the degree of inclination of the detected face. When a plurality of faces are detected by the face detecting unit 302, the preferential face determining unit 304 determines the face of a principal subject among the plurality of faces detected by the face detecting unit 302 to be a preferential face. When only a face is detected by the face detecting unit 302, the preferential face determining unit 304 determines the face to be a preferential face. When no face is detected by the face detecting unit 302, the preferential face determining unit 304 outputs a message indicating there is no preferential face to the subject distance calculating unit 305 and the detection frame setting unit 309.

The subject distance calculating unit 305 calculates subject distances (distances to a preferential face), that is, the distances between the preferential face determined by the preferential face determining unit 304 and the imaging apparatus 100, and outputs the values of the calculated subject distances to the face-AF-range calculating unit 307. Specifically, the subject distance calculating unit 305 calculates two subject distances based on reference value 1 and reference value 2 held in the reference value holding unit 306, the width of the face image corresponding to the preferential face output from the preferential face determining unit 304, and a current focal position output from the AF control unit 311. That is, a subject distance based on reference value 1 and a subject distance based on reference value 2 are calculated. The calculation of the subject distances is described in detail below with reference to FIGS. 5A to 7.

The reference value holding unit 306 holds reference values 1 and 2 used to calculate subject distances and supplies reference values 1 and 2 held therein to the subject distance calculating unit 305. Here, for example, reference value 1 is a value of the width of a relatively large face of an average person, whereas reference value 2 is a value of the width of a relatively small face of an average person. For example, reference value 1 is the size of a relatively large face of an average adult, whereas reference value 2 is the size of a face of an average infant.

The face-AF-range calculating unit 307 calculates a face-AF-range, which is a range where the focus lens 112 is moved to detect an in-focus position of a detected face, based on two subject distances calculated by the subject distance calculating unit 305, and outputs the calculated face-AF-range to the face-AF-range use determination range calculating unit 308 and the AF control unit 311. The setting of an AF range is described in detail below with reference to FIGS. 8 to 9B.

The face-AF-range use determination range calculating unit 308 calculates a face-AF-range use determination range, which is a predetermined range including the face-AF-range output from the face-AF-range calculating unit 307, that is, a range to determine whether AF control is to be performed by using the face-AF-range, and outputs the calculated face-AF-range use determination range to the AF control unit 311. The face-AF-range use determination range includes the face-AF-range output from the face-AF-range calculating unit 307 and ranges of a depth of 3 to 9 added before and after the face-AF-range.

Also, the face-AF-range use determination range calculating unit 308 calculates a face-AF-range reuse determination range, which is a predetermined range including the face-AF-range output from the face-AF-range calculating unit 307, that is, a range to determine whether AF control is to be performed by reusing a once-reset face-AF-range, and outputs the calculated face-AF-range reuse determination range to the AF control unit 311. The face-AF-range reuse determination range includes the face-AF-range output from the face-AF-range calculating unit 307 and ranges of a depth of 0.5 to 1.5 added before and after the face-AF-range. The calculation of the face-AF-range use determination range and the face-AF-range reuse determination range is described in detail below with reference to FIGS. 9A to 11B.

The detection frame setting unit 309 sets a detection frame (AF detection frame) at the position of a preferential face determined by the preferential face determining unit 304 in a captured image output from the imaging unit 301, and outputs the position of the set detection frame to the face-AF-range use cancel determining unit 310 and the AF control unit 311. Also, the detection frame setting unit 309 performs a tracking process on the set detection frame. If no face is detected from a captured image, the detection frame setting unit 309 sets a detection frame at the center of the captured image. The setting of a detection frame is described in detail below with reference to FIGS. 3A to 4C.

The face-AF-range use cancel determining unit 310 extracts high-frequency components in the detection frame that is set at the position of a preferential face by the detection frame setting unit 309 in a captured image output from the imaging unit 301, and determines whether a cancel condition to cancel AF control using the once-set face-AF-range is satisfied based on the extracted high-frequency components. If determining that the cancel condition is satisfied, the face-AF-range use cancel determining unit 310 outputs the determination result to the AF control unit 311.

Now, a description is given about the high-frequency components that are used for determination by the face-AF-range use cancel determining unit 310. For example, in consumer moving image AF, a passive contrast extracting AF method of controlling focus based on contrast information of captured image data obtained from an imaging device is typically used. In this contrast extracting AF method, an in-focus position is detected by calculating a movement direction of a focus lens in a direction of maximizing contrast based on an output of a digital filter (bandpass filter) to extract high-frequency components of captured image data. The digital filter extracts a plurality of high-frequency components in a predetermined band matching the sharpness of a captured image based on captured image data included in a detection frame provided in a specific area in the captured image.

The plurality of extracted high-frequency components include a first high-frequency component Fh, which is a component on a high-frequency side in high-frequency components; and a second high-frequency component Fa, which is a component on a low-frequency side in the high-frequency components. The first high-frequency component Fh is a high-frequency component that can be extracted even in an AF state before correct focus is achieved or in an out-of-focus state, whereas the second high-frequency component Fa is a high-frequency component whose value can be obtained only in the state where focus is almost achieved.

By using the first high-frequency component Fh and the second high-frequency component Fa extracted in the above-described manner, the face-AF-range use cancel determining unit 310 determines whether the above-described cancel condition is satisfied. Specifically, the face-AF-range use cancel determining unit 310 compares an average value Fha, which is a short time average of the first high-frequency component Fh obtained from the detection frame (face frame) set at the position of a preferential face by the detection frame setting unit 309, with a value C1, which is calculated by multiplying a coring value of the face frame as an integrated value of high-frequency information in a wideband of the face frame by a constant K1. If the average value Fha is larger than the value C1, the face-AF-range use cancel determining unit 310 sets an Fh existence flag to "1". On the other hand, if the average value Fha is equal to or smaller than the value C1, the face-AF-range use cancel determining unit 310 sets the Fh existence flag to "0". When the Fh existence flag is "1", it can be determined that sufficient high-frequency components exist in the area of the face frame.

Likewise, the face-AF-range use cancel determining unit 310 compares an average value Faa, which is a short time average of the second high-frequency component Fa obtained from the face frame, with a value C2, which is calculated by multiplying the coring value of the face frame as an integrated value of high-frequency information of a wideband of the face frame by a constant K2. If the average value Faa is larger than the value C2, the face-AF-range use cancel determining unit 310 sets an Fa existence flag to "1". On the other hand, if the average value Faa is equal to or smaller than the value C2, the face-AF-range use cancel determining unit 310 sets the Fa existence flag to "0". When the Fa existence flag is "1", it can be determined that sufficient high-frequency components exist in the area of the face frame. In the above-described determination, it can be determined that a subject including a predetermined edge is included in the face frame and that contrast recognizable as a subject exists in an area included in the face frame.

In this way, as a result of the determination made by using the first high-frequency component Fh and the second high-frequency component Fa, if the Fh existence flag and the Fa existence flag are "1", it can be determined that the subject included in the face frame exists while having a predetermined amount or more of high-frequency components. In this case, it can be determined that appropriate AF control using the face-AF-range can be performed, and thus it is determined that the cancel condition to cancel AF control using the once-set face-AF-range is not satisfied. Also, in this case, it can be determined that a wobbling operation can be performed. On the other hand, if at least one of the Fh existence flag and the Fa existence flag is "0", it is not determined that the subject included in the face frame exists while having a predetermined amount or more of high-frequency components. In this case, it can be determined that appropriate AF control using the face-AF-range is not performed, and thus it is determined that the cancel condition to cancel AF control using the once-set face-AF-range is satisfied.

The AF control unit 311 performs AF control of moving the focus lens 112 by controlling the motor driver 190 and detecting an in-focus position of a predetermined subject. Specifically, the AF control unit 311 determines whether a current position of the focus lens 112 is within the face-AF-range use determination range output from the face-AF-range use determination range calculating unit 308 and performs AF control based on the determination result. That is, if the current position of the focus lens 112 is within the face-AF-range use determination range, the AF control unit 311 performs AF control on the captured image output from the imaging unit 301 by moving the focus lens 112 into the face-AF-range calculated by the face-AF-range calculating unit 307 based on the detection frame set at the position of the preferential face by the detection frame setting unit 309. On the other hand, if the current position of the focus lens 112 is outside the face-AF-range use determination range, the AF control unit 311 performs ordinary AF control by using contrast extracting AF on the captured image output from the imaging unit 301 based on the detection frame set at the position of the preferential face by the detection frame setting unit 309.

When a determination that the cancel condition is satisfied is output from the face-AF-range use cancel determining unit 310 while the AF control unit 311 is performing AF control using the face-AF-range, the AF control unit 311 cancels the setting of the face-AF-range and performs ordinary AF control by using contrast extracting AF.

Furthermore, after the setting of the face-AF-range has been canceled, if the current position of the focus lens 112 is within the face-AF-range reuse determination range output from the face-AF-range use determination range calculating unit 308 in the state where a determination that the cancel condition is not satisfied is output from the face-AF-range use cancel determining unit 310, the AF control unit 311 performs AF control using the face-AF-range. Also, the AF control unit 311 outputs a current focal length to the subject distance calculating unit 305.

Now, an AF control method of performing AF control using captured image data output from the imaging unit 301 is described.

As described above, contrast extracting AF has been widely used as AF control using captured image data. In the contrast extracting AF, it is determined that focus has been achieved (in-focus level is high) when the level of a contrast signal is high, and it is determined that focus has not been achieved (in-focus level is low) when the level of the contrast signal is low.

Here, the contrast signal is data (AF evaluation value) of integrated high-frequency components existing in a specific area of a screen in an image signal of a captured image of a subject. As the value of the contrast signal is larger, the contrast of the subject is high. As the value of the contrast signal is smaller, the contrast of the subject is low. That is, the subject in an AF area can be focused on by placing the focus lens at the position where the highest contrast can be obtained. Accordingly, AF control can be realized.

As the AF control method, a hill-climbing mode and a hunting mode are widely adopted. In the hill-climbing mode, the position of a focus lens is controlled so that an AF evaluation value is kept at the peak (for example, the focus lens is moved during a period from when the out-of-focus level is high until when the peak as a maximum point of a high-frequency detection value is detected). In the hunting mode, a back-and-forth motion is repeated toward the peak of a detection value with high precision through hunting of the detection value near a detection value focal point as an indicator of the amount of contrast.

During hunting and at a point near the focus peak, a wobbling mode of moving the focus lens back and forth toward a direction of detecting a focal position can be applied. In the wobbling mode, if the peak is continuously kept in a certain range, a stopped state occurs and AF is in a standby state until a detection value varies. Any of those AF control methods can be used in the embodiment of the present invention. Note that, if AF control using the face-AF-range is performed, it is preferred to adopt the wobbling mode, which is more suitable for a low-speed operation than the hill-climbing mode.

In-focus position detection determining conditions in the case of detecting an in-focus position include: "first high-frequency component Fh/second high-frequency component Fa" is sufficiently high; and a detection value has a sufficient large contrast value with respect to the amount of noise that varies depending on illuminance (i.e. Fh is sufficiently high).

If the AF control unit 311 performs AF control using the face-AF-range, the AF control unit 311 slowly moves the focus lens 112 in the face-AF-range while maintaining a speed limit until the cancel condition is satisfied. When the position of the focus lens 112 reaches an end of the face-AF-range, the AF control unit 311 reverses the movement direction of the focus lens 112. In this case, if the focus lens 112 stays at the end of the face-AF-range for a certain period, it is possible that the in-focus position exists outside the face-AF-range, and thus the face-AF-range may be canceled.

Figure 3A:
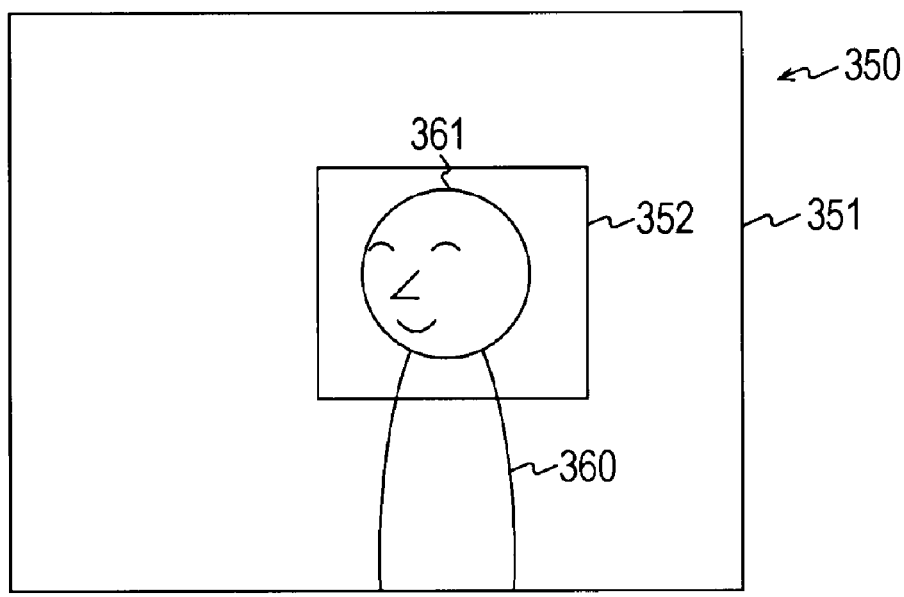
FIGS. 3A and 3B illustrate examples of setting a detection frame by a detection frame setting unit according to the embodiment of the present invention.
Figure 3B:
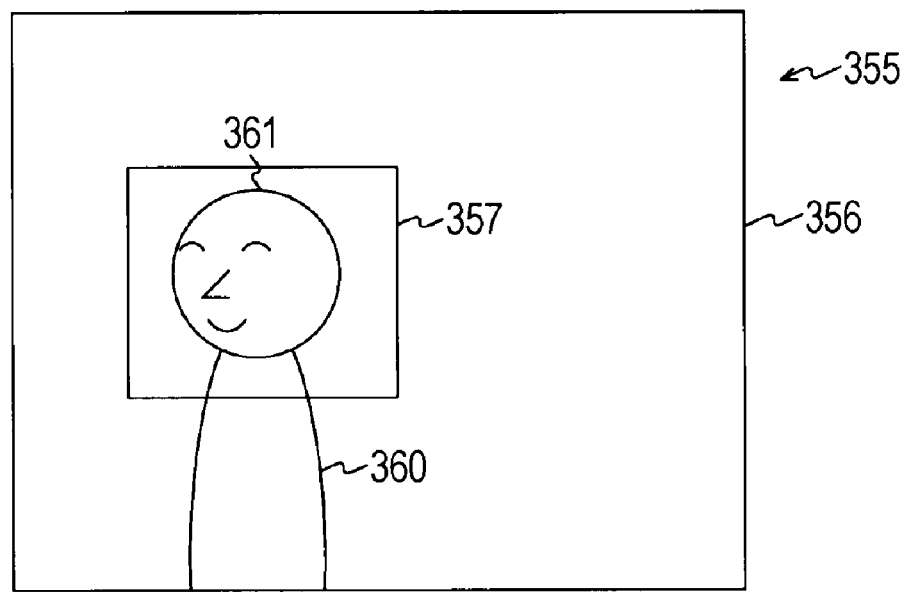

FIGS. 3A and 3B illustrate examples of setting a detection frame by the detection frame setting unit 309 according to the embodiment of the present invention. Captured images 350 and 355 illustrated in FIGS. 3A and 3B are captured images output from the imaging unit 301.

As illustrated in FIG. 3A, in the captured image 350, an entire frame 351 as a detection frame to obtain high-frequency components in the area of almost the entire screen is set, and also a face frame 352 as a detection frame to obtain high-frequency components in an area smaller than the entire screen is set. The face frame 352 is a detection frame that is set for a detected face when a face 361 is detected by the face detecting unit 302. When a plurality of faces are detected, the face frame is set for a preferential face determined by the preferential face determining unit 304.

FIG. 3B illustrates a case where the face 361 illustrated in FIG. 3A has moved to the left on the captured image. As illustrated in FIG. 3B, if the face 361 as a target of the set face frame 352 moves, the face frame 352 tracks the moving face 361 and extraction of high-frequency components is continuously performed. In the embodiment of the present invention, the size of the face frame is fixed and the face frame tracks the position of the face. By fixing the size of the face frame, the size of the face frame does not vary and a stable detection value can be extracted. That is, time for a normalizing process can be shortened and the amount of change in detection value can be relatively reduced, so that appropriate measures can be taken against movement of a face and camera shake.

Figure 4A:
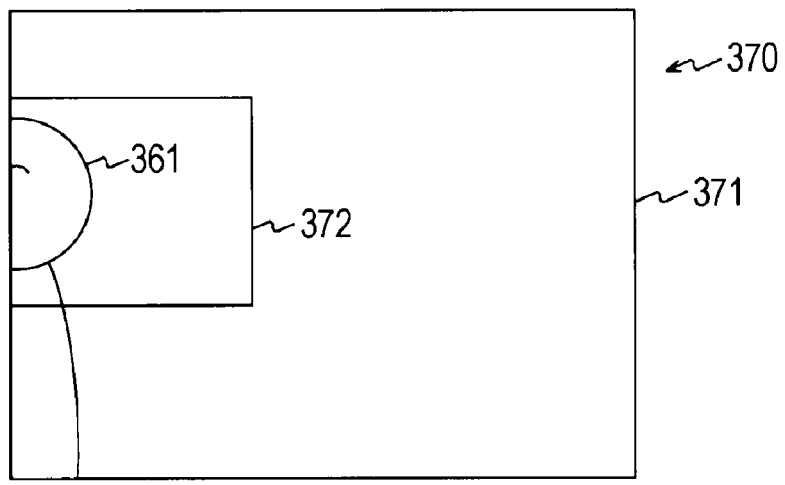
FIGS. 4A to 4C illustrate examples of tracking a detection frame in the case where the size of a face frame is fixed.
Figure 4B:
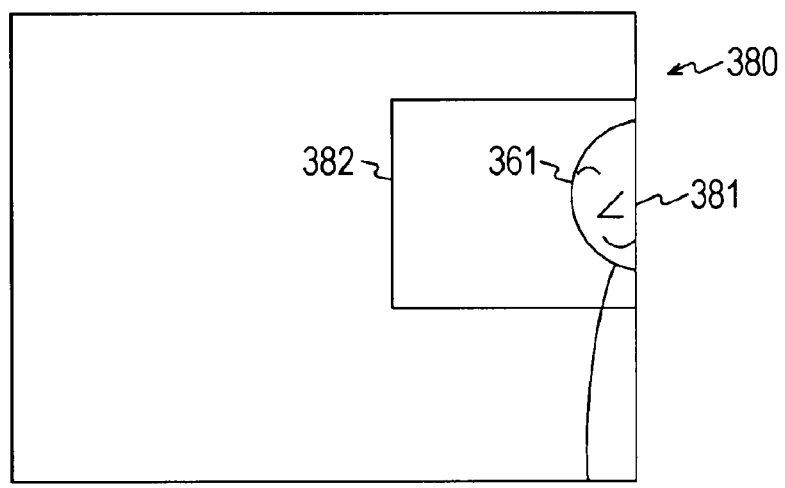
Figure 4C:
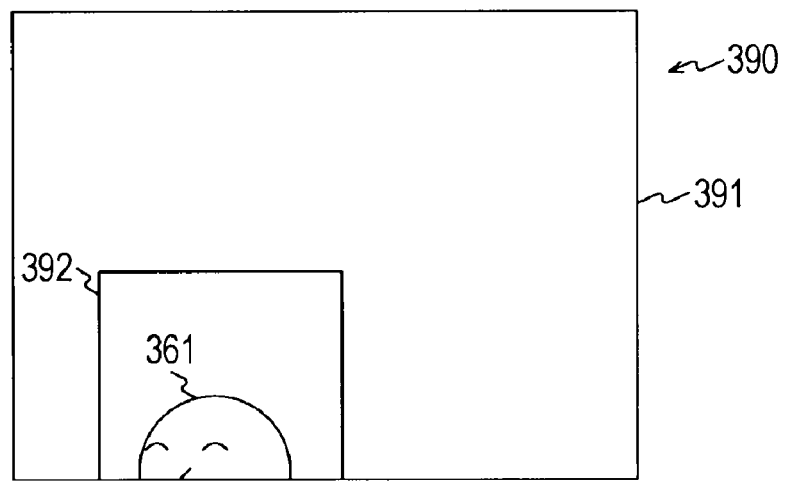

FIGS. 4A to 4C illustrate tracking examples of the detection frame in the case where the size of the face frame is fixed. FIG. 4A illustrates a case where the face 361 illustrated in FIGS. 3A and 3B moves to the left on the captured image, whereby part of the face 361 goes out of an entire frame 371. FIG. 4B illustrates a case where the face 361 illustrated in FIGS. 3A and 3B moves to the right on the captured image, whereby part of the face 361 goes out of an entire frame 381. FIG. 4C illustrates a case where the face 361 illustrated in FIGS. 3A and 3B moves downward on the captured image, whereby part of the face 361 goes out of an entire frame 391.

As illustrated in FIGS. 4A to 4C, when part of the face 361 included in the captured images 370 to 390 moves to the outside of the entire frames 371, 381, and 391, face frames 372, 382, and 392 track the face 361 while keeping contact with the inner side of the entire frames 371, 381, and 391. In such tracking, the ratio between the entire frame and the face frame does not change. Accordingly, acquisition of an unexpected detection value can be prevented and a stable detection value can be extracted.

Next, a distance calculating method for calculating distances between the imaging apparatus 100 and a preferential face determined by the preferential face determining unit 304 is described in detail with reference to the drawings. Here, a description is given about a distance calculating method for estimating distances between the imaging apparatus 100 and a face by using the size of a face of an average person (reference values 1 and 2).

Figure 5A:
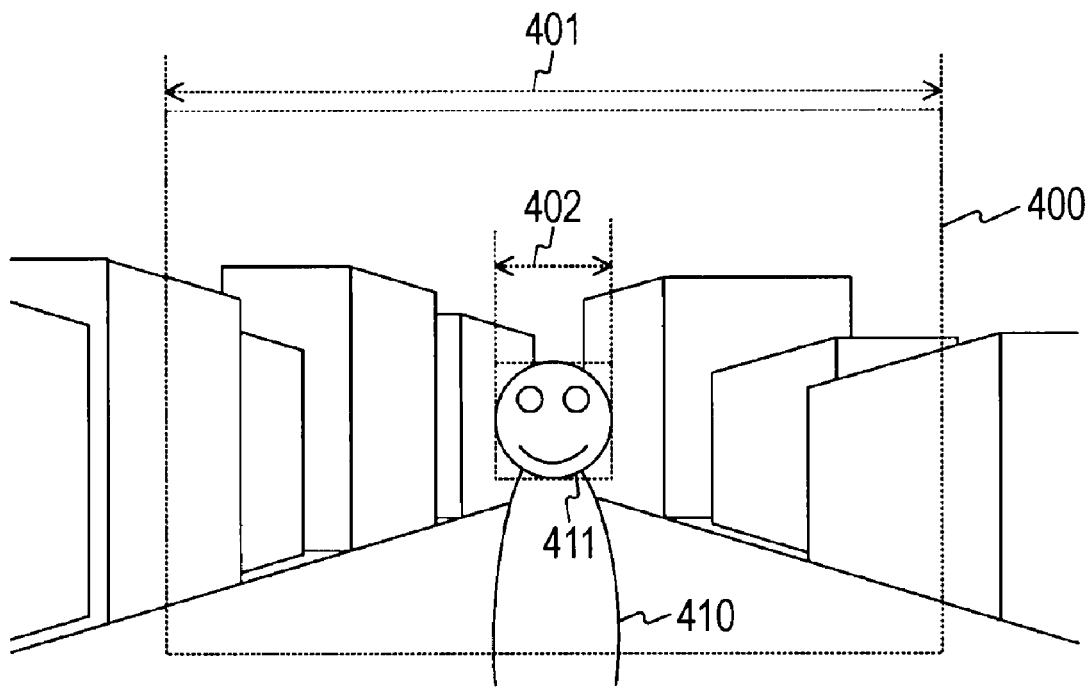
FIGS. 5A and 5B schematically illustrate captured images of a subject displayed in an imaging range and on a liquid crystal panel, respectively.
Figure 5B:
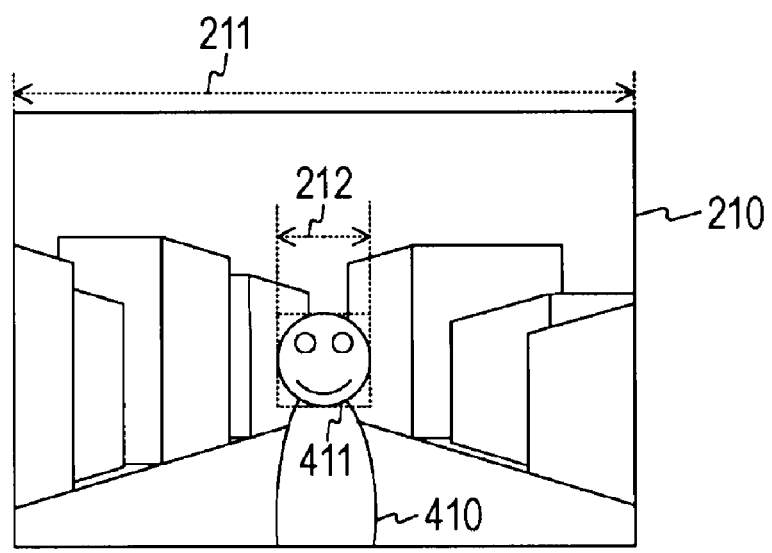

FIGS. 5A and 5B schematically illustrate captured images displayed in an imaging range 400 with respect to a subject and on the liquid crystal panel 210 (or the viewfinder 220). FIG. 5A schematically illustrates the imaging range 400 in the case where an image of a person 410 with a background of a plurality of buildings is captured, whereas FIG. 5B illustrates a display example on the liquid crystal panel 210 of the captured image corresponding to the imaging range 400 illustrated in FIG. 5A.

For example, as illustrated in FIG. 5A, in the case where an image is captured with the person 410 standing with a background of a plurality of buildings being a subject, the imaging range 400 is determined in accordance with the positions of the imaging apparatus 100 and the zoom lens. Also, as illustrated in FIG. 5B, incident light from the subject included in the imaging range 400 is converted to a captured image by the imaging unit 301, and the captured image is displayed on the liquid crystal panel 210.

In the imaging range 400 illustrated in FIG. 5A, the width in the horizontal direction in the imaging apparatus 100 is defined as an imaging range width (Wa) 401, and the width in the horizontal direction of a face 411 of the person 410 included in the imaging range 400 is defined as a face width (Wref) 402. The face width (Wref) 402 is not the width of an actual face of the person 410, but is the width of a face of an average person. Also, the width in the horizontal direction of the captured image illustrated in FIG. 5B is defined as an image width (Ww) 211, and the width in the horizontal direction of the face 411 of the person 410 included in the captured image is defined as a face image width (Wf) 212. In this case, the ratio between the imaging range width (Wa) 401 and the face width (Wref) 402 is the same as the ratio between the image width (Ww) 211 and the face image width (Wf) 212 in a typical case.

Figure 6:
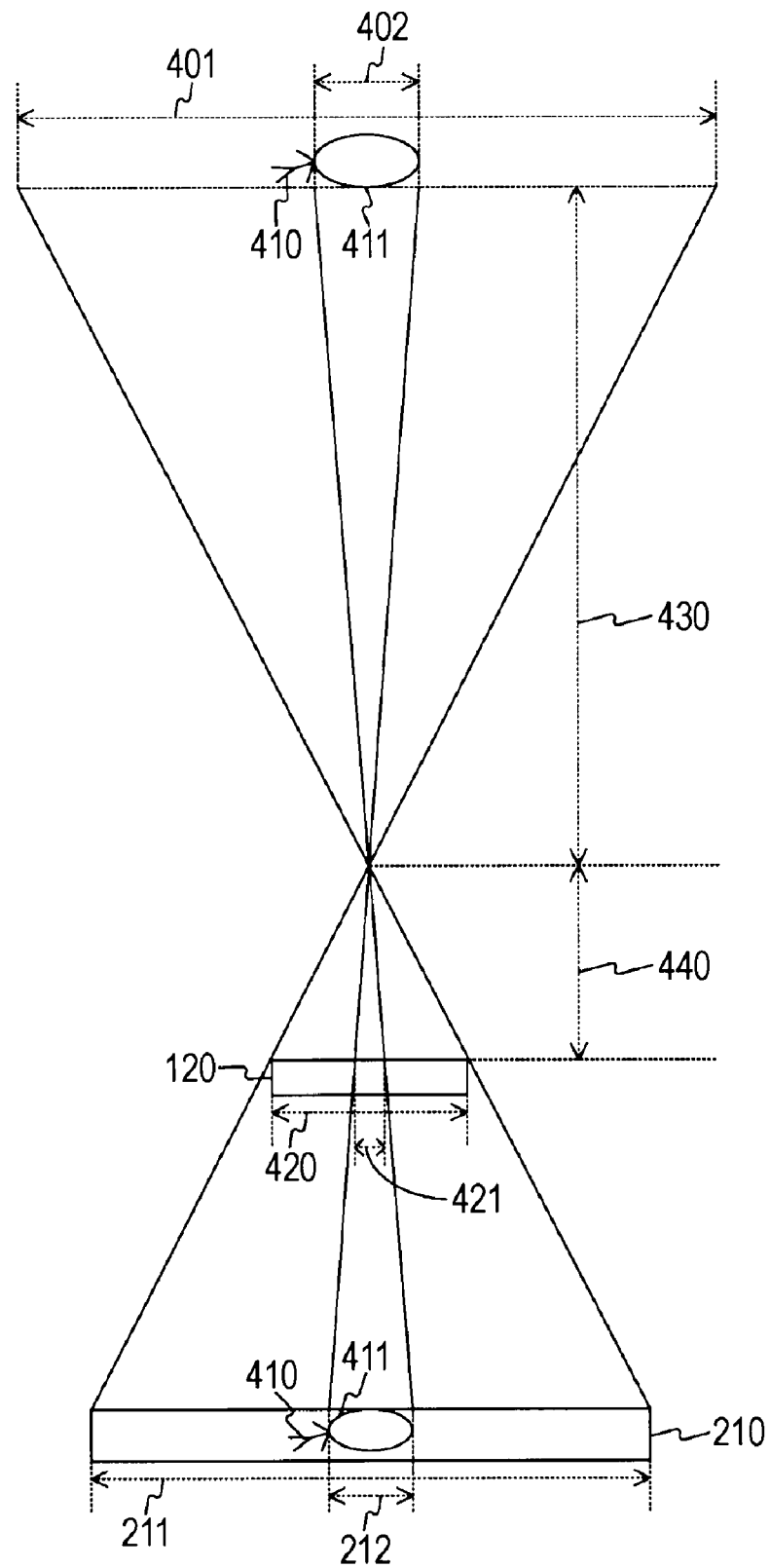
FIG. 6 is a top view schematically illustrating a positional relationship between a person and an imaging device and the liquid crystal panel included in the imaging apparatus to capture an image of the person.

FIG. 6 is a top view schematically illustrating a positional relationship between the person 410 illustrated in FIG. 5A and the imaging device 120 and the liquid crystal panel 210 included in the imaging apparatus 100 to capture an image of the person 410. As illustrated in FIG. 6, the distance between the imaging apparatus 100 and the face 411 is defined as a subject distance (Df) 430, a focal length in the imaging apparatus 100 is defined as a focal length (f) 440, and the width of the imaging device 120 is defined as an imaging device width (Wi) 420. The imaging range width (Wa) 401 and the face width (Wref) 402 are the same as those illustrated in FIG. 5A.

As illustrated in FIG. 6, when incident light from the subject included in the imaging range 400 enters the imaging device 120, a captured image corresponding to the subject included in the imaging range 400 is generated, and the generated captured image is displayed on the liquid crystal panel 210. In this case, the width of the face on the imaging device 120 when the incident light from the face 411 of the person 410 enters the imaging device 120 is a face width (Wb) 421 on the imaging device.

The following two expressions are established based on the relationship between parallel lines and a ratio.

$$Df/Wref=f/Wb \quad \text{(expression 1)}$$

$$Wf/Ww=Wb/Wi \quad \text{(expression 2)}$$

Here, expression 1 is transformed into $Df=f\times Wref/Wb$, and expression 2 is transformed into $Wb=Wf\times Wi/Ww$. Then, $Wb=Wf\times Wi/Ww$ obtained by transforming expression 2 is substituted into expression 1, so as to establish the following expression 3. Expression 3 is obtained based on a fundamental physical law of a lens.

$$Df=Wref\times(f/Wi)\times(Ww/Wf) \quad \text{(expression 3)}$$

Here, Wi (imaging device width) and Ww (image width) are constants, and the width of a face of an average person is used as Wref. In this case, Df (estimated distance to the face) can be calculated by using expression 3 by detecting Wf (face image width).

For example, as illustrated in FIG. 5A, in the case where the face 411 of one person is included in the imaging range 400, the face 411 is detected by the face detecting unit 302 from the captured image corresponding to the imaging range 400, and the face 411 is determined to be a preferential face by the preferential face determining unit 304. After the preferential face has been determined by the preferential face determining unit 304, the subject distance calculating unit 305 calculates the subject distance (Df) 430 by using the width of the face image detected for the preferential face based on expression 3. In the embodiment of the present invention, two subject distances are calculated by using two reference values of the size of a face of an average person, and a face-AF-range is calculated based on the two subject distances. Hereinafter, an example of calculating two subject distances by using reference values 1 and 2 is described in detail with reference to FIG. 7.

Figure 7:
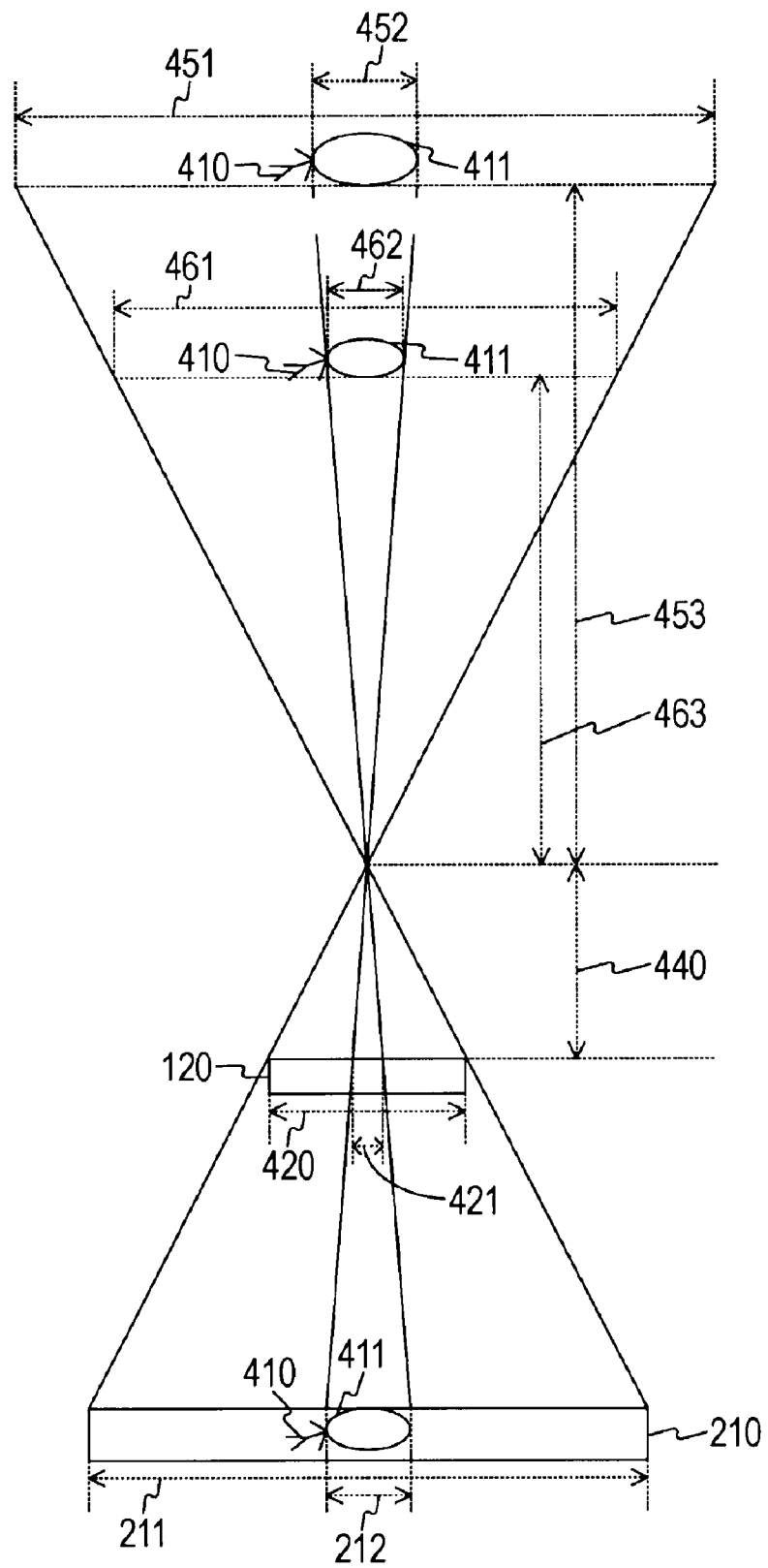
FIG. 7 is a top view schematically illustrating a positional relationship in the case where two subject distances are calculated by using reference values 1 and 2 held in a reference value holding unit.

FIG. 7 is a top view schematically illustrating a positional relationship in the case of calculating two subject distances based on expression 3 by using reference values 1 and 2 held in the reference value holding unit 306. In FIG. 7, the lower part from the focal length (f) 440 is the same as that illustrated in FIG. 6 and is denoted by the same reference numeral, and the corresponding description is omitted.

In FIG. 7, an imaging range width (Wa1) 451 and a face width (Wref1) 452 that are estimated on the assumption that the size of the face 411 is the same as reference value 1 are illustrated in an upper side, and an imaging range width (Wa2) 461 and a face width (Wref2) 462 estimated on the assumption that the size of the face 411 is the same as reference value 2 are illustrated in a lower side. A subject distance calculated based on expression 3 by using reference value 1 is defined as a subject distance (Df1) 453, and a subject distance calculated based on expression 3 by using reference value 2 is defined as a subject distance (Df2) 463.

As described above, even if the sizes of faces in captured images displayed on the liquid crystal panel 210 are the same, the subject distances are different if the sizes of actual faces are different. Thus, a more appropriate face-AF-range can be calculated by calculating the two subject distances by using reference values 1 and 2 corresponding to the sizes of large and small faces of average persons.

Next, a focus lens position estimating method for estimating the position of the focus lens to focus on a preferential face by using the subject distances Df1 and Df2 calculated by using expression 3 is described in detail with reference to the drawings.

Figure 8:
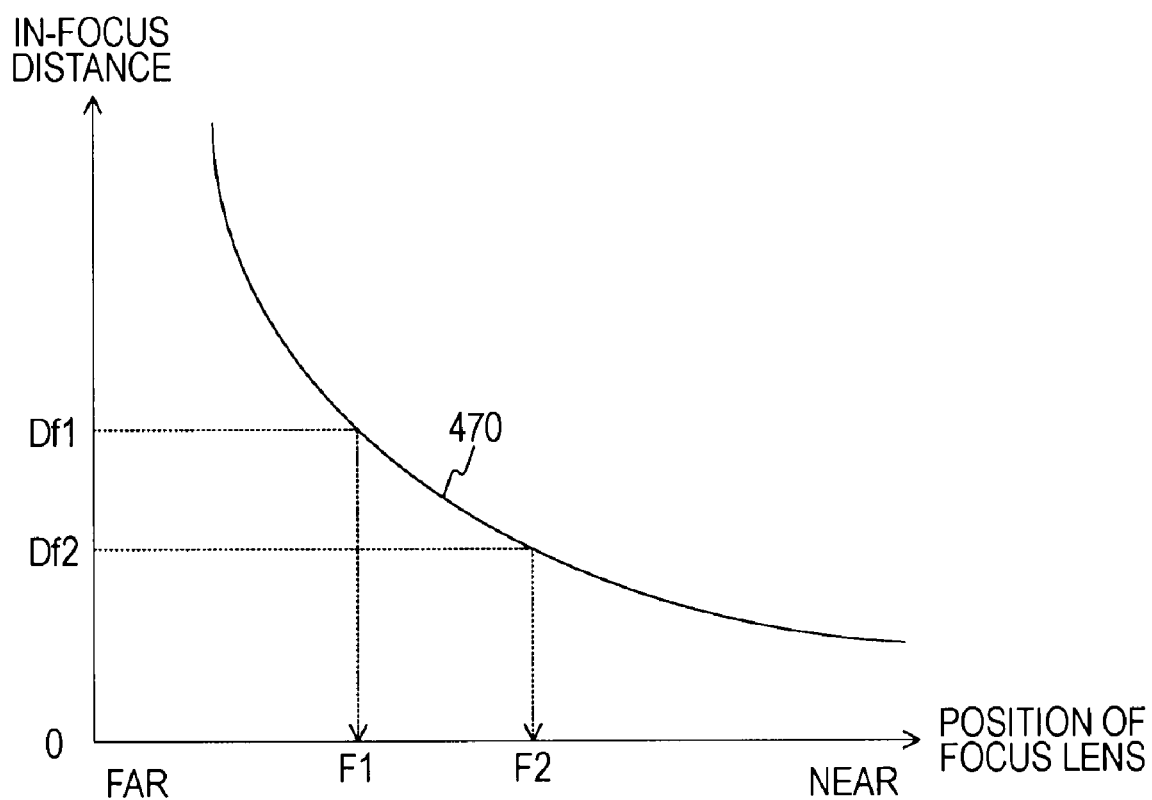
FIG. 8 illustrates an example of a characteristic curve indicating a relationship between an in-focus distance that is a distance between the imaging apparatus and a subject when focus on the subject is achieved and the position of a focus lens.

FIG. 8 illustrates an example of a characteristic curve indicating the relationship between the distance from the imaging apparatus 100 to the subject when focus on the subject is achieved (in-focus distance) and the position of the focus lens 112. This characteristic curve is determined in accordance with the position of the zoom lens 111, and errors are taken into consideration. In the graph of the characteristic curve illustrated in FIG. 8, the vertical axis indicates the in-focus distance, and the horizontal axis indicates the position of the focus lens 112. In the horizontal axis, the left side is a far side and the right side is a near side. This characteristic curve varies in respective lenses used in imaging apparatuses. In the embodiment of the present invention, the face-AF-range calculating unit 307 holds the characteristic curve illustrated in FIG. 8. As illustrated in FIG. 8, if the subject distances between the imaging apparatus and the subject have been obtained, the position of the focus lens 112 to achieve focus on the subject can be calculated.

For example, the position of the focus lens 112 corresponding to the subject distance (Df1) 453 calculated by using expression 3 can be obtained as an estimated position F1, and the position of the focus lens 112 corresponding to the subject distance (Df2) 463 can be obtained as an estimated position F2. In this way, when the subject distances between the imaging apparatus and the subject are given, the position of the focus lens 112 for achieving focus on the face detected from the captured image can be calculated. In the embodiment of the present invention, the face-AF-range calculating unit 307 calculates the estimated positions F1 and F2.

Next, a face-AF-range calculating method for calculating the face-AF-range, where the focus lens 112 is moved, after a face has been detected is described in detail with reference to the drawings.

Figure 9A:
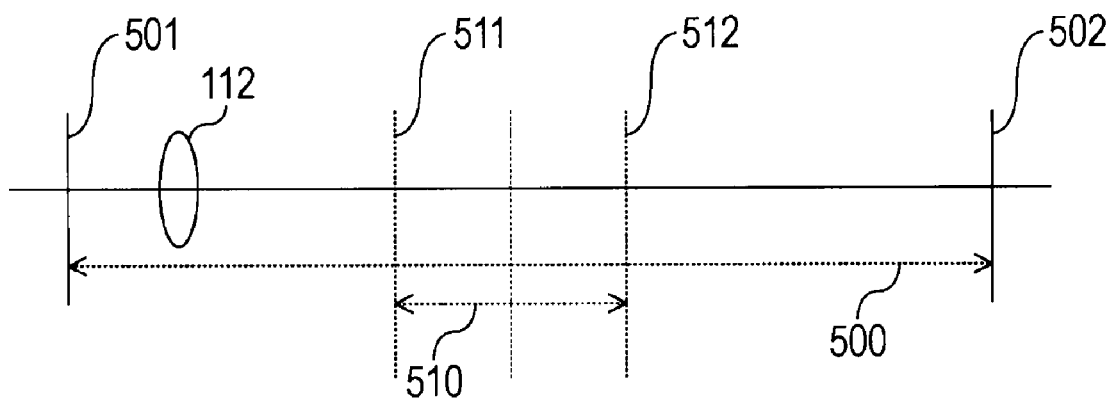
FIGS. 9A and 9B illustrate an example of a face-AF-range that is set based on distances Df1 and Df2 and a face-AF-range use determination range that is calculated based on the face-AF-range.

FIG. 9A illustrates an example of the face-AF-range that is set based on the distances Df1 and Df2 calculated by the subject distance calculating unit 305. In FIG. 9A, the horizontal axis indicates a focus lens movable range 500 where the focus lens 112 can move. The focus lens movable range 500 is defined by a closest-side limit 501 and an infinite-side limit 502. For example, in the state where no face has been detected from a captured image, AF control is performed in the focus lens movable range 500 (in the entire range from the closest-side limit 501 to the infinite-side limit 502). That is, an in-focus position is detected by moving the focus lens 112 in the entire range from the closest-side limit 501 to the infinite-side limit 502.

On the other hand, in the state where one or more faces have been detected from a captured image, the subject distances Df1 and Df2 are calculated by the subject distance calculating unit 305 based on the width of a face image of a preferential face among the detected faces, and an estimated position (F1) 511, which is an in-focus position estimated based on the subject distance Df1, and an estimated position (F2) 512, which is an in-focus position estimated based on the subject distance Df2, are calculated. Then, a face-AF-range 510 is calculated based on the calculated estimated position (F1) 511 and estimated position (F2) 512. That is, the face-AF-range 510 is the range defined by the estimated position (F1) 511 and the estimated position (F2) 512. The face-AF-range 510 is the range where the focus lens 112 is moved when AF control is performed on a face detected by the face detecting unit 302.

In such a case where a face has been detected, the range where the focus lens 112 is movable to perform AF control on the face can be narrowed relative to an ordinary movement range. Accordingly, an in-focus position can be quickly detected.

Next, a use determination range calculating method for calculating a use determination range to determine whether AF control using a calculated face-AF-range is performed after a face has been detected is described in detail with reference to the drawings.

Figure 9B:
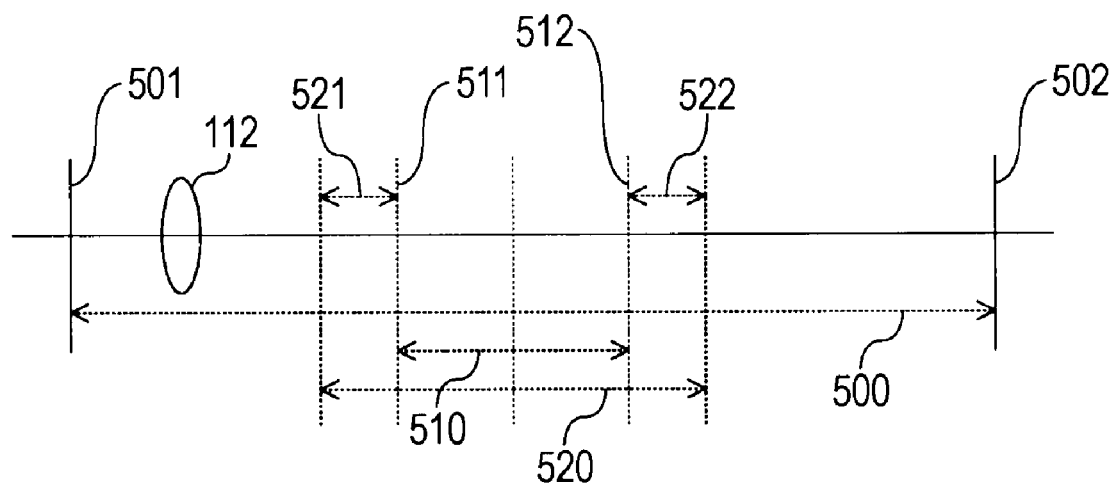

FIG. 9B illustrates an example of a face-AF-range use determination range that is calculated based on the face-AF-range 510 illustrated in FIG. 9A. In FIG. 9B, the horizontal axis is the same as that illustrated in FIG. 9A.

As illustrated in FIG. 9B, a face-AF-range use determination range 520 includes the face-AF-range 510 illustrated in FIG. 9A and additional ranges 521 and 522 added before and after the face-AF-range 510. The face-AF-range use determination range 520 is a range to determine whether an in-focus position is to be detected by moving the focus lens 112 in the face-AF-range 510 when AF control is performed on a face detected by the face detecting unit 302. Specifically, if the position of the focus lens 112 exists in the face-AF-range use determination range 520 when a face is detected, the in-focus position is detected by moving the focus lens 112 in the face-AF-range 510. On the other hand, if the position of the focus lens 112 does not exist in the face-AF-range use determination range 520 when a face is detected, the in-focus position is detected by moving the focus lens 112 in the entire focus lens movable range 500.

In this way, if the current position of the focus lens 112 does not exist near the face-AF-range 510, AF control using the face-AF-range 510 is not performed. Accordingly, shaking or movement in a long distance of the focus lens 112 can be prevented even if false detection of a face occurs, and thus AF control can be stably performed.

Now, the additional ranges added before and after the face-AF-range 510 in the face-AF-range use determination range 520 are described. As the additional ranges, a value of about 3 to 9 can be used for a focal depth on one side. Preferably, a depth of about 4. A focus stroke (movable distance) per focal depth differs and the operation also differs on the wide end side (wide angle side) and the tele end side (telephoto side). Thus, the additional ranges may be changed in accordance with the position of the zoom lens 111 as illustrated in FIGS. 10A and 10B.

Figure 10A:
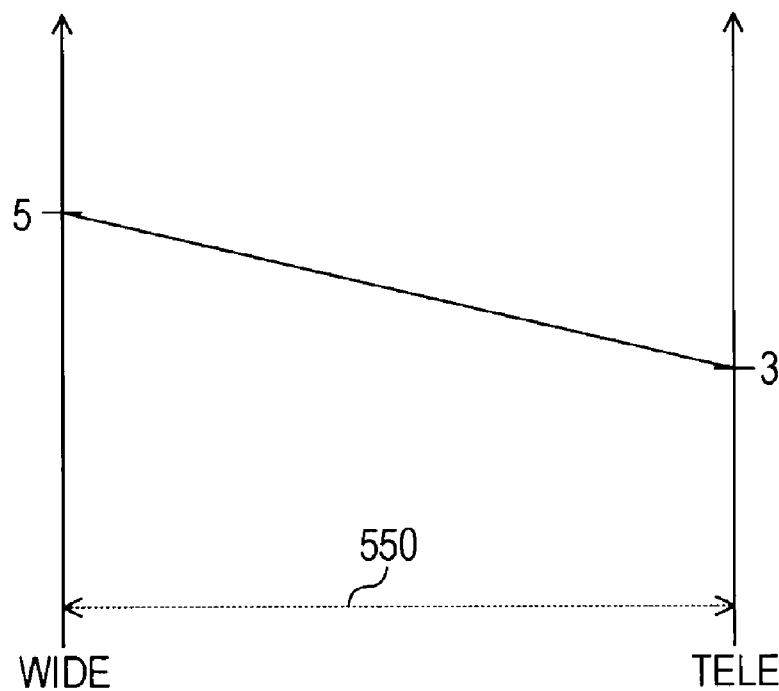
FIGS. 10A and 10B illustrate an example of setting additional ranges in the case where the additional ranges are changed in accordance with the position of a zoom lens.
Figure 10B:
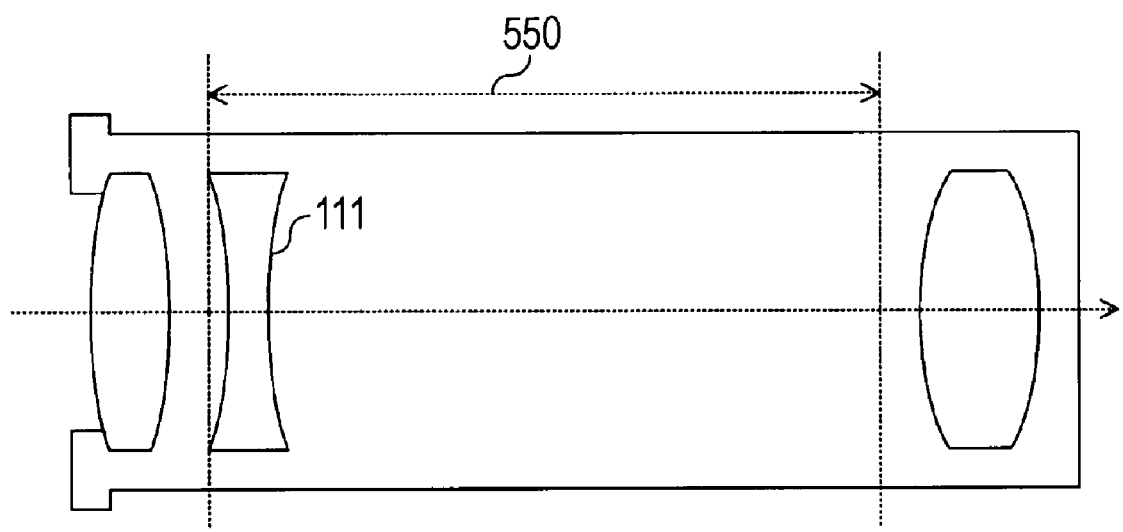

FIGS. 10A and 10B illustrate an example of setting additional ranges when the additional ranges are changed in accordance with the position of the zoom lens 111. FIG. 10A illustrates the relationship between the position of the zoom lens 111 and the additional ranges that are set. FIG. 10B schematically illustrates a zoom lens movable range 550 of the zoom lens 111.

In the graph illustrated in FIG. 10A, the vertical axis indicates the value of the additional ranges, and the horizontal axis indicates the position of the zoom lens 111. In the horizontal axis, the wide end is at the left and the tele end is at the right. In the embodiment of the present invention, the face-AF-range use determination range calculating unit 308 holds the graph illustrated in FIG. 10A.

As illustrated in FIG. 10A, when the position of the zoom lens 111 exists on the wide end side, a large value is set as the value of an additional range. When the position of the zoom lens 111 exists on the tele end side, a small value is set as the value of an additional range. In this case, a depth of 3 to 5 can be set as the value of the additional range. As the zoom lens 111 is operated toward the tele end, blurring before and after a subject becomes significant. Therefore, the value of the additional range is decreased at the tele end by considering the case where the subject distance is estimated based on a significantly blurred face. Accordingly, even if the zoom lens 111 is at the tele end, an appropriate operation can be performed when a face in a poster is detected or a face is falsely detected.

Next, a detailed description is given with reference to the drawings about a reuse determination range calculating method for calculating a reuse determination range to determine whether a face-AF-range of which use has been canceled is to be reused after AF control using the face-AF-range has been canceled.

Figure 11A:
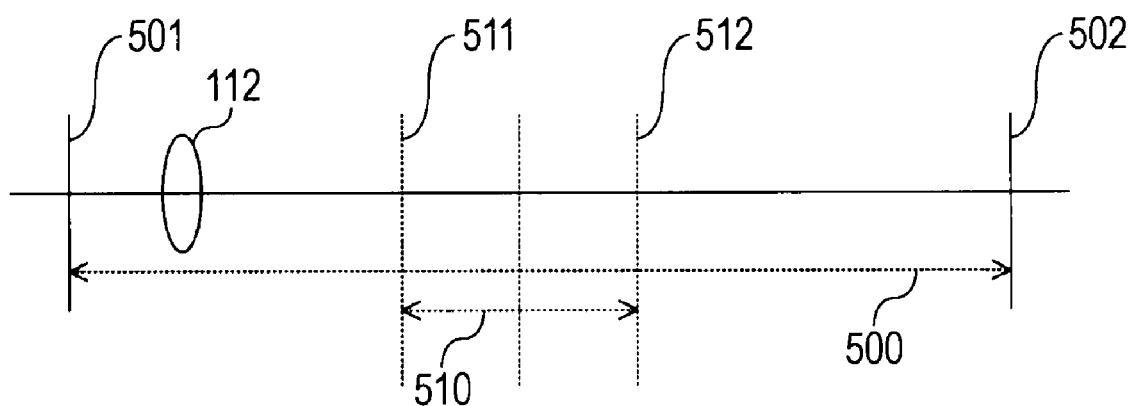
FIGS. 11A and 11B illustrate an example of a face-AF-range that is set based on distances Df1 and Df2 and a face-AF-range reuse determination range that is calculated based on the face-AF-range.
Figure 11B:
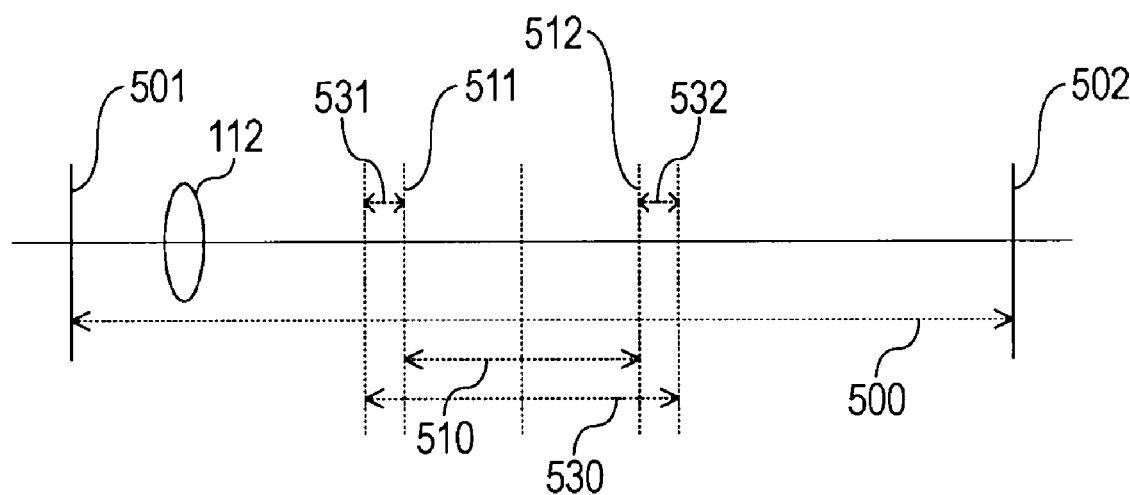

FIG. 11B illustrates an example of a face-AF-range reuse determination range that is calculated based on the face-AF-range 510 illustrated in FIG. 9A. The horizontal axis illustrated in FIG. 11B is the same as that illustrated in FIG. 9A. FIG. 11A is the same as FIG. 9A.

As illustrated in FIG. 11B, a face-AF-range reuse determination range 530 includes the face-AF-range 510 illustrated in FIG. 11A and additional ranges 531 and 532 added before and after the face-AF-range 510. The face-AF-range reuse determination range 530 is a range to determine whether the face-AF-range of which use has been canceled is to be reused in the state where the use of the face-AF-range is canceled while AF control using the face-AF-range is being performed in the case where AF control is performed on a face detected by the face detecting unit 302. Specifically, in the case where a cancel condition is not satisfied and where it is determined that the position of the focus lens 112 exists in the face-AF-range reuse determination range 530 in the state where use of the face-AF-range 510 is canceled, an in-focus position is detected by using the face-AF-range 510. On the other hand, in the case where a cancel condition is satisfied or in the case where the position of the focus lens 112 does not exist in the face-AF-range reuse determination range 530 in the state where use of the face-AF-range 510 is canceled, an in-focus position is detected by using the entire focus lens movable range 500.

Now, the additional ranges added before and after the face-AF-range 510 in the face-AF-range reuse determination range 530 are described. As the additional ranges, a value of about 0.5 to 1.5 can be used for a focal depth on one side. Preferably, a depth of about 1. Here, the value of the additional ranges added to the face-AF-range reuse determination range 530 can be smaller than the value of the additional ranges added to the face-AF-range use determination range 520. That is, the face-AF-range reuse determination range 530 is narrower than the face-AF-range use determination range 520.

In this way, by setting a value to the additional ranges added to the face-AF-range reuse determination range 530, the value being smaller than the value set to the additional ranges added to the face-AF-range use determination range 520, the focus lens can be quickly moved when the face-AF-range is reused. Furthermore, the movement range of the focus lens 112 can be limited only when there is no failure in the state where the face-AF-range is canceled, and thus AF control can be stably performed.

Hereinafter, an operation of the imaging apparatus 100 according to the embodiment of the present invention is described with reference to the drawings.

FIG. 12 is a flowchart illustrating a procedure of an AF control process performed by the imaging apparatus 100 according to the embodiment of the present invention. This procedure is performed at certain intervals. In this example, a case of using the face-AF-range 510, the face-AF-range use determination range 520, and the face-AF-range reuse determination range 530 illustrated in FIGS. 9A, 9B, 11A, and 11B is described.

First, it is determined whether a face has been detected by the face detecting unit 302 in the captured image output from the imaging unit 301 (step S901).

If it is determined that no face has been detected (step S901), the detection frame setting unit 309 sets a detection frame (center frame) near the center of the captured image (step S902), and the process proceeds to step S909. On the other hand, if it is determined that a face has been detected (step S901), the detection frame setting unit 309 sets a detection frame (face frame) at the position of the face in the captured image (step S903). If a plurality of faces have been detected by the face detecting unit 302, the detection frame is set at the position of a preferential face determined by the preferential face determining unit 304. The set face frame tracks the movement of the detected face.

Then, the subject distance calculating unit 305 calculates two subject distances based on the size of the detected face image and on reference values 1 and 2 held in the reference value holding unit 306 (step S904). Then, the face-AF-range calculating unit 307 calculates the face-AF-range 510 based on the two calculated subject distances (step S905).

Then, the face-AF-range use determination range calculating unit 308 calculates the face-AF-range use determination range 520 and the face-AF-range reuse determination range 530 including the face-AF-range 510 calculated by the face-AF-range calculating unit 307 (step S906). Then, the AF control unit 311 determines whether the current position of the focus lens 112 exists in the face-AF-range use determination range 520 (step S907).

If the current position of the focus lens 112 exists in the face-AF-range use determination range 520 (step S907), the AF control unit 311 sets the face-AF-range 510 calculated by the face-AF-range calculating unit 307 as a movement range of the focus lens 112 in an AF control process (step S908). Then, the AF control unit 311 performs an AF control process in the set face-AF-range 510 (step S920). This AF control process is described in detail below with reference to FIG. 13.

If the current position of the focus lens 112 does not exist in the face-AF-range use determination range 520 (step S907), the AF control unit 311 sets the focus lens movable range 500 as the movement range of the focus lens 112 in an AF control process (step S909). Then, the AF control unit 311 performs an AF control process in the set focus lens movable range 500 (step S910). The AF control performed in step 910 is ordinary AF control.

Figure 13:
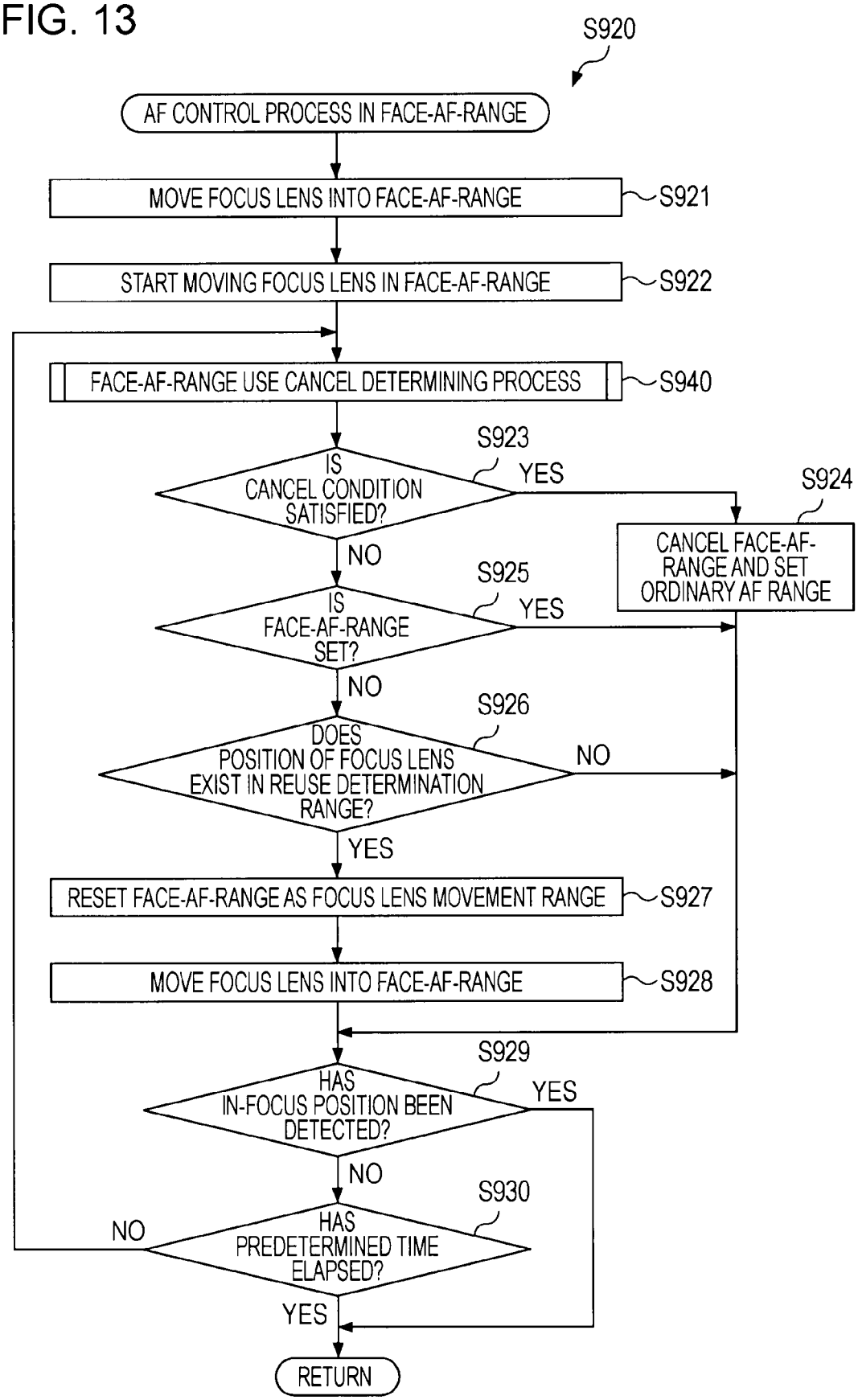
FIG. 13 is a flowchart illustrating a procedure of an AF control process in a face-AF-range performed by the imaging apparatus according to the embodiment of the present invention.

FIG. 13 is a flowchart illustrating a procedure of the AF control process in the face-AF-range (step S920 in FIG. 12) in the procedure of the AF control process performed by the imaging apparatus 100 according to the embodiment of the present invention.

First, if the current position of the focus lens 112 exists in the face-AF-range use determination range 520 but not in the face-AF-range 510, the AF control unit 311 moves the focus lens 112 into the face-AF-range 510 (step S921). Then, the AF control unit 311 starts AF control by moving the focus lens 112 in the face-AF-range 510 (step S922). Then, the face-AF-range use cancel determining unit 310 performs a face-AF-range use cancel determining process to determine whether the AF control using the set face-AF-range 510 is to be canceled (step S940). The face-AF-range use cancel determining process is described in detail below with reference to FIG. 14.

As a result of the determination made in the face-AF-range use cancel determining process, if a cancel condition is satisfied (step S923), the AF control unit 311 cancels the set face-AF-range 510 and sets the focus lens movable range 500 as a movement range of the focus lens 112 in the AF control process (step S924). Accordingly, the AF control unit 311 performs ordinary AF control. If the face-AF-range 510 has been canceled and the focus lens movable range 500 has been set, the setting of the focus lens movable range 500 is maintained. On the other hand, as a result of the determination made in the face-AF-range use cancel determining process, if a cancel condition is not satisfied (step S923), the AF control unit 311 determines whether the face-AF-range 510 is set as the movement range of the focus lens 112 in the AF control process (step S925).

If the face-AF-range 510 is set as the movement range of the focus lens 112 in the AF control process (step S925), the process proceeds to step S929, where the AF control unit 311 performs AF control in the set face-AF-range 510. On the other hand, if the face-AF-range 510 is not set as the movement range of the focus lens 112 in the AF control process, that is, if the focus lens movable range 500 is set (step 925), it is determined whether the current position of the focus lens 112 exists in the face-AF-range reuse determination range 530 (step S926).

If the current position of the focus lens 112 exists in the face-AF-range reuse determination range 530 (step S926), the AF control unit 311 resets the face-AF-range 510 as the movement range of the focus lens 112 in the AF control process (step S927). Also, if the current position of the focus lens 112 exists in the face-AF-range reuse determination range 530 but not in the face-AF-range 510, the focus lens 112 is moved into the face-AF-range 510 (step S928). On the other hand, if the current position of the focus lens 112 does not exist in the face-AF-range reuse determination range 530

(step S926), the process proceeds to step S929, where the AF control unit 311 performs AF control in the set focus lens movable range 500.

The AF control unit 311 moves the focus lens 112 in the set face-AF-range 510 or focus lens movable range 500, thereby determining whether an in-focus position of the detected face has been detected (step S929).

If the in-focus position has been detected in the set face-AF-range 510 or focus lens movable range 500 (step S929), the AF control process ends. On the other hand, if the in-focus position has not been detected in the set face-AF-range 510 or focus lens movable range 500 (step S929), it is determined whether predetermined time has elapsed (step S930). If the predetermined time has not elapsed (step S930), the process returns to step S940 and the AF control process is repeated (steps S923 to S929 and S940). On the other hand, if the predetermined time has elapsed (step S930), the AF control process ends.

Figure 14:
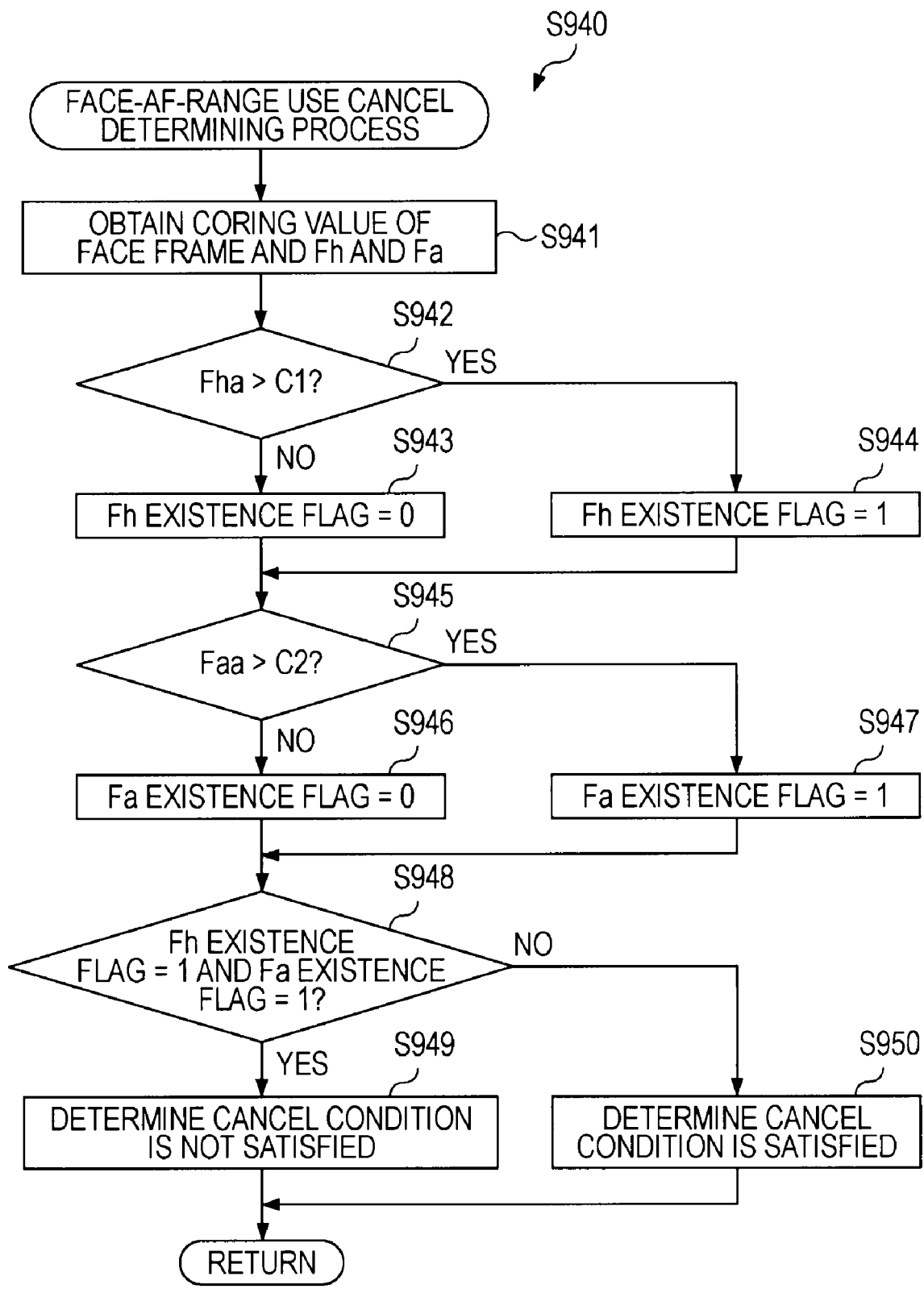
FIG. 14 is a flowchart illustrating a procedure a face-AF-range use cancel determining process performed by the imaging apparatus according to the embodiment of the present invention.

FIG. 14 is a flowchart illustrating the face-AF-range use cancel determining process (step S940 in FIG. 13) in the procedure of the AF control process performed by the imaging apparatus 100 according to the embodiment of the present invention.

First, the face-AF-range use cancel determining unit 310 obtains a first high-frequency component Fh, a second high-frequency component Fa, and a coring value of the face frame which is an integrated value of high-frequency information of a wideband of the face frame from the image area included in the detected frame (face frame) set at the position of the preferential face by the detection frame setting unit 309 (step S941).

Then, the face-AF-range use cancel determining unit 310 compares an average value Fha with a value C1, the average value Fha being a short time average of the obtained first high-frequency component Fh, and the value C1 being calculated by multiplying the coring value of the face frame by a constant K1, and determines whether the average value Fha is larger than the value C1 (step S942).

If the average value Fha is larger than the value C1 (step S942), the face-AF-range use cancel determining unit 310 sets the Fh existence flag to "1" (step 944). On the other hand, if the average value Fha is equal to or smaller than the value C1 (step S942), the face-AF-range use cancel determining unit 310 sets the Fh existence flag to "0" (step 943).

Then, the face-AF-range use cancel determining unit 310 compares an average value Faa with a value C2, the average value Faa being a short time average of the obtained second high-frequency component Fa, and the value C2 being calculated by multiplying the coring value of the face frame by a constant K2, and determines whether the average value Faa is larger than the value C2 (step S945).

If the average value Faa is larger than the value C2 (step S945), the face-AF-range use cancel determining unit 310 sets the Fa existence flag to "1" (step 947). On the other hand, if the average value Faa is equal to or smaller than the value C2 (step S945), the face-AF-range use cancel determining unit 310 sets the Fa existence flag to "0" (step 946).

Then, the face-AF-range use cancel determining unit 310 determine whether the Fh existence flag and the Fa existence flag are set to "1" (step S948). If the Fh existence flag and the Fa existence flag are set to "1" (step S948), the face-AF-range use cancel determining unit 310 determines that the cancel condition to cancel AF control using the face-AF-range is not satisfied (step S949). On the other hand, if at least one of the Fh existence flag and the Fa existence flag is not "1" (step S948), the face-AF-range use cancel determining unit 310 determine that the cancel condition to cancel AF control using the face-AF-range is satisfied (step S950).

As described above, according to the embodiment of the present invention, in the case where a face has been detected, the face-AF-range that is smaller than an ordinary movement range can be used as the movement range of the focus lens 112 when AF control is performed on the face, and thus an in-focus position can be quickly detected. If the current position of the focus lens 112 does not exist in the face-AF-range use determination range 520, AF control using the face-AF-range is not performed, so that a malfunction of the focus lens 112 can be prevented. For example, movement in a long distance of the focus lens 112 can be prevented even if a false detection of a face occurs. Accordingly, resistance to a face detection error and shaking becomes high, occurrence of focusing on an undesired subject in the background can be suppressed, and stable focus control can be performed by accurately tracking a main subject. Also, stable and accurate focusing on a low-contrast face can be achieved. That is, appropriate focusing can be performed regardless of movement of a subject or movement of an imaging apparatus during imaging.

Furthermore, in the case where blurring occurs in the face as a target of AF control, a once-set face-AF-range can be canceled and ordinary AF control can be performed. Accordingly, even if blurring of a detected face occurs, an in-focus position of this face can be appropriately detected. If it is determined after the face-AF-range has been canceled that a cancel condition is not satisfied and that the current position of the focus lens 112 exists in the face-AF-range reuse determination range 530, AF control using the face-AF-range can be restarted. In this way, if blurring occurs in the detected face and then the blurring immediately disappears, the in-focus position of this face can be appropriately detected.

In the above-described embodiment of the present invention, an example of calculating the face-AF-range by calculating two subject distances by using reference values 1 and 2 has been described. Alternatively, a subject distance may be calculated by using a reference value or subject distances may be calculated by using three or more reference values, and the face-AF-range may be calculated based on the subject distance(s). Alternatively, an attribute about a face may be determined and a reference value may be changed in accordance with the attribute of the face. As the attribute of the face, generation (child/adult) may be used, for example. Furthermore, a calculating method on the near side of the face-AF-range may be different from a calculating method on the far side. Specifically, as for a subject that is unstable on the near side, the range is expanded to a movable range of the subject that is expected based on system delay, and the position of the focus lens is fixed at finite (e.g., 64 m). On the other hand, on the far side, as for the area at a sufficiently far point (e.g., 64 m), the focus lens is set at infinite and the movable range thereof is not extremely limited.

In the case where the amount of movement of a detected face or the amount of camera shake is large, or in the case where it can be determined that the reliability of the face frame is low as in a pan/tilt state or a zooming state, a center frame may be set instead of the face frame. In order to detect the movement of a subject, a motion vector on the screen, an acceleration (gyro) sensor for camera shake correction, the amount of movement of the face frame, input of a zoom lever, and so on may be used.

Setting conditions to set the face-AF-range include the following: scan AF is not being performed; zooming is not being performed; the function of face estimation or face moving image AF is in an ON state; or an AF function is in an ON state. Also, the setting conditions include the following: a conversion lens is attached and a switch to turn OFF the face AF setting during a conversion lens mode is not turned ON; certain time has elapsed after the face frame has been set; and the face is not too small.

Also, conditions to allow the detection frame to track a detected face include the following: a face AF function is in an ON state; a face frame tracking function is in an ON state; zooming is not being performed; certain time has elapsed after the face is detected; the number of detected faces is 1 or more; and a residual counter of the detection frame (a counter to count the time after the face attached with the detection frame disappears) remains. Also, the conditions include the following: the face frame moves at a sufficiently low speed with respect to the size of the detection frame; and the face frame is not too small.

During a zooming operation, setting of the face-AF-range can be limited in accordance with the zooming speed. For example, if the zooming speed is equal to or higher than a certain speed, the setting of the face-AF-range is turned OFF. If the zooming speed is sufficiently low, the setting of the face-AF-range is turned ON. Alternatively, the setting of the face-AF-range may be turned ON after the zooming operation ends.

In the case where AF control using the face-AF-range is being performed, display of the face frame or an indicator may be changed so as to notify a photographer that focusing on the face attached with the face frame is being tried.

In the embodiment of the present invention, an example of calculating subject distances by using the width of a face as the size of the face of a person has been described. Alternatively, the subject distances may be calculated by using another value related to the face, e.g., the height of the face or a diagonal value of the face.

In the embodiment of the present invention, an example of detecting a face of a person included in a captured image and setting a face-AF-range about the detected face has been described. The embodiment of the present invention can also be applied to a case of detecting an object other than a face of a person included in a captured image and setting an object-AF-range related to the detected object. The object other than the face of a person included in the captured image includes a face of a pet, such as a cat or a dog; a face of an animal, such as a horse or a cow; and a vehicle, such as a car or a train.

In the embodiment of the present invention, an example of determining a preferential face among a plurality of faces if the faces are selected has been described. Alternatively, imaging control including exposure control may be performed by using a plurality of faces as preferential faces.

In the embodiment of the present invention, an imaging apparatus is used as an example. The embodiment of the present invention can also be applied to other various types of imaging apparatuses, such as a digital still camera having a face detecting function and an AF function, or a mobile phone having an imaging unit.

The processes described in the embodiment of the present invention may be regarded as a method including the series of processes, as a program allowing a computer to execute the series of processes, or as a recording medium to store the program.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   object information holding means for holding a size of a predetermined object included in a subject;
   imaging means for converting incident light from the subject to a captured image;
   object detecting means for detecting the object included in the captured image and a size of an object image, the size of the object image being a size of the object in the captured image;
   object-autofocus-range calculating means for calculating an object-autofocus-range that is a limited movement range of a focus lens based on the detected size of the object image and the size of the object held in the object information holding means;
   use determination range calculating means for calculating a use determination range that is a range to determine whether detection of an in-focus position of the detected object is to be performed in the object-autofocus-range and that includes the object-autofocus-range; and
   autofocus control means for detecting the in-focus position by setting the object-autofocus-range as the movement range of the focus lens and moving the focus lens in the object-autofocus-range if a current position of the focus lens is within the use determination range.

2. The imaging apparatus according to claim 1, further comprising:
   detection frame setting means for setting a detection frame for the detected object at a position of the detected object in the captured image; and
   cancel determining means for determining whether a cancel condition is satisfied based on high-frequency components in an image area included in the set detection frame, the cancel condition being a certain condition to cancel setting of the object-autofocus-range,
   wherein the autofocus control means detects the in-focus position by canceling setting of the object-autofocus-range and using an entire movable range of the focus lens if it is determined that the cancel condition is satisfied.

3. The imaging apparatus according to claim 2,
   wherein the use determination range calculating means calculates a reuse determination range that is a range to determine whether the object-autofocus-range is to be reset and that includes the object-autofocus-range, and
   wherein the autofocus control means detects the in-focus position by resetting the object-autofocus-range as the movement range of the focus lens if it is determined that the cancel condition is not satisfied and if the current position of the focus lens is within the reuse determination range in the state where detection of the in-focus position is being performed using the entire movable range after setting of the object-autofocus-range has been canceled.

4. The imaging apparatus according to claim 3,
   wherein the use determination range calculating means calculates a range narrower than the use determination range as the reuse determination range.

5. The imaging apparatus according to claim 1,
   wherein the use determination range calculating means calculates the use determination range by adding certain ranges before and after the object-autofocus-range.

6. The imaging apparatus according to claim 5,
   wherein the use determination range calculating means changes the certain ranges in accordance with a position of a zoom lens.

7. The imaging apparatus according to claim 1,
wherein the object information holding means holds at least a first size and a second size different from each other about the object, and
wherein the object-autofocus-range calculating means calculates a first subject distance that is a distance to the detected object based on the detected size of the object image and the first size of the object held in the object information holding means and calculates a second subject distance that is a distance to the detected object based on the detected size of the object image and the second size of the object held in the object information holding means, thereby calculating the object-autofocus range based on the calculated first and second subject distances.

8. The imaging apparatus according to claim 1,
wherein the autofocus control means detects the in-focus position by performing wobbling in the object-autofocus-range.

9. A method for controlling an imaging apparatus including object information holding means for holding a size of a predetermined object included in a subject; the method comprising the steps of:
converting incident light from the subject to a captured image;
detecting the object included in the captured image and a size of an object image, the size of the object image being a size of the object in the captured image;
calculating an object-autofocus-range that is a limited movement range of a focus lens based on the detected size of the object image and the size of the object held in the object information holding means;
calculating a use determination range that is a range to determine whether detection of an in-focus position of the detected object is to be performed in the object-autofocus-range and that includes the object-autofocus-range; and
detecting the in-focus position by setting the object-autofocus-range as the movement range of the focus lens and moving the focus lens in the object-autofocus-range if a current position of the focus lens is within the use determination range.

10. An imaging apparatus comprising:
an object information holding unit configured to hold a size of a predetermined object included in a subject;
an imaging unit configured to convert incident light from the subject to a captured image;
an object detecting unit configured to detect the object included in the captured image and a size of an object image, the size of the object image being a size of the object in the captured image;
an object-autofocus-range calculating unit configured to calculate an object-autofocus-range that is a limited movement range of a focus lens based on the detected size of the object image and the size of the object held in the object information holding unit;
a use determination range calculating unit configured to calculate a use determination range that is a range to determine whether detection of an in-focus position of the detected object is to be performed in the object-autofocus-range and that includes the object-autofocus-range; and
an autofocus control unit configured to detect the in-focus position by setting the object-autofocus-range as the movement range of the focus lens and moving the focus lens in the object-autofocus-range if a current position of the focus lens is within the use determination range.

* * * * *